US012781373B2

(12) United States Patent
Ueno et al.

(10) Patent No.: US 12,781,373 B2
(45) Date of Patent: Nov. 3, 2026

(54) SURFACE-TREATED STEEL SHEET AND METHOD OF PRODUCING SAME

(71) Applicant: JFE STEEL CORPORATION, Tokyo (JP)

(72) Inventors: Takashi Ueno, Tokyo (JP); Yusuke Nakagawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/847,833

(22) PCT Filed: Feb. 20, 2023

(86) PCT No.: PCT/JP2023/006070
§ 371 (c)(1),
(2) Date: Sep. 17, 2024

(87) PCT Pub. No.: WO2023/195252
PCT Pub. Date: Oct. 12, 2023

(65) Prior Publication Data

US 2025/0034739 A1 Jan. 30, 2025

(30) Foreign Application Priority Data

Apr. 8, 2022 (JP) ................................ 2022-064802

(51) Int. Cl.

| | |
|---|---|
| ***C25D 3/06*** | (2006.01) |
| ***B32B 15/01*** | (2006.01) |
| ***B32B 15/04*** | (2006.01) |
| ***B32B 15/18*** | (2006.01) |
| ***C23C 28/00*** | (2006.01) |
| ***C23C 28/02*** | (2006.01) |
| ***C23C 30/00*** | (2006.01) |

(Continued)

(52) U.S. Cl.
CPC ................ *C25D 3/06* (2013.01); *B32B 15/01* (2013.01); *B32B 15/013* (2013.01); *B32B 15/015* (2013.01); *B32B 15/04* (2013.01); *B32B 15/043* (2013.01); *B32B 15/18* (2013.01); *C23C 28/02* (2013.01); *C23C 28/023* (2013.01); *C23C 28/30* (2013.01); *C23C 28/32* (2013.01); *C23C 28/322* (2013.01); *C23C 30/00* (2013.01); *C23C 30/005* (2013.01); *C25D 3/12* (2013.01); *C25D 3/14* (2013.01); *C25D 5/12* (2013.01); *C25D 5/14* (2013.01); *C25D 5/36* (2013.01); *C25D 5/48* (2013.01); *C25D 5/505* (2013.01); *C25D 7/0614* (2013.01); *Y10T 428/1259* (2015.01); *Y10T 428/1266* (2015.01); *Y10T 428/12667* (2015.01); *Y10T 428/12708* (2015.01); *Y10T 428/12722* (2015.01); *Y10T 428/12847* (2015.01); *Y10T 428/12854* (2015.01); *Y10T 428/12937* (2015.01); *Y10T 428/12944* (2015.01); *Y10T 428/12972* (2015.01); *Y10T 428/12993* (2015.01); *Y10T 428/24942* (2015.01); *Y10T 428/2495* (2015.01); *Y10T 428/24959* (2015.01);

(Continued)

(58) Field of Classification Search
CPC ... C25D 3/06; C25D 3/12; C25D 3/14; C25D 5/12; C25D 5/14; C25D 5/36; C25D 5/48; C25D 5/505; C25D 7/0614; C23C 28/02; C23C 28/023; C23C 28/30; C23C 28/32; C23C 28/322; C23C 30/00; C23C 30/005; B32B 15/01; B32B 15/013; B32B 15/015; B32B 15/04; B32B 15/043; B32B 15/18; Y10T 428/12708; Y10T 428/12722; Y10T 428/12847; Y10T 428/1259; Y10T 428/1266; Y10T 428/12667; Y10T 428/12937; Y10T 428/12944; Y10T 428/12972; Y10T 428/12993; Y10T 428/2495; Y10T 428/24942; Y10T 428/24959; Y10T 428/24967; Y10T 428/27; Y10T 428/263; Y10T 428/264; Y10T 428/265; Y10T 428/26; Y10T 428/12854
See application file for complete search history.

(56) References Cited

U.S. PATENT DOCUMENTS 4,429,021 A 1/1984 Higashi et al.
4,501,802 A * 2/1985 Higuchi .................. C25D 5/12 220/678

(Continued)

FOREIGN PATENT DOCUMENTS

CN 105386089 A 3/2016
JP S55134197 A 10/1980

(Continued)

OTHER PUBLICATIONS

Gorb, et al., "Attachment force of the beetle *Cryptolaemus montrouzieri* (Coleoptera, Coccinellidai) on leaflet surfaces . . . " in Arthropod-Plant Interactions (Nov. 2008) 2:247-259. (Year: 2008).*
Maurice et al., "XPS, LEED, and STM study of thin oxide films formed on Cr(110)" in Surface Science 458 (no month, 2000) 195-215. (Year: 2000).*
Aug. 1, 2025, the Extended European Search Report issued by the European Patent Office in the corresponding European Patent Application No. 23784545.8.

(Continued)

*Primary Examiner* — Michael E. La Villa
(74) *Attorney, Agent, or Firm* — KENJA IP LAW PC

(57) ABSTRACT

Provided is a surface-treated steel sheet that can be produced without using hexavalent chromium and is excellent in adhesion to BPA-free paint and BPA-free painting corrosion resistance. A surface-treated steel sheet comprises: a steel sheet; a metallic Cr layer disposed on a surface of the steel sheet on at least one side; and a Cr oxide layer disposed on the metallic Cr layer, wherein a contact angle of ethylene glycol is 50° or less, and a total atomic ratio of K, Na, Mg, and Ca adsorbed on a surface of the surface-treated steel sheet on the at least one side to Cr is 5.0% or less.

16 Claims, No Drawings

(51) Int. Cl.

| | |
|---|---|
| ***C25D 3/12*** | (2006.01) |
| ***C25D 3/14*** | (2006.01) |
| ***C25D 5/12*** | (2006.01) |
| ***C25D 5/14*** | (2006.01) |
| ***C25D 5/36*** | (2006.01) |
| ***C25D 5/48*** | (2006.01) |
| ***C25D 5/50*** | (2006.01) |
| ***C25D 7/06*** | (2006.01) |

(52) U.S. Cl.

CPC ...... *Y10T 428/24967* (2015.01); *Y10T 428/26* (2015.01); *Y10T 428/263* (2015.01); *Y10T 428/264* (2015.01); *Y10T 428/265* (2015.01); *Y10T 428/27* (2015.01)

(56) References Cited

U.S. PATENT DOCUMENTS

| | | | | |
|---|---|---|---|---|
| 4,687,713 | A | 8/1987 | Ogata et al. | |
| 6,280,852 | B1 | 8/2001 | Shimizu et al. | |
| 12,195,858 | B2 * | 1/2025 | Ueno | C25D 5/14 |
| 12,195,868 | B2 * | 1/2025 | Ueno | C25D 3/06 |
| 2014/0042033 | A1 | 2/2014 | Schulz et al. | |
| 2014/0227529 | A1 | 8/2014 | Yamanaka et al. | |
| 2015/0329981 | A1 | 11/2015 | Wijenberg et al. | |
| 2016/0289841 | A1 | 10/2016 | Suzuki et al. | |
| 2018/0355496 | A1 | 12/2018 | Nakagawa et al. | |
| 2020/0190679 | A1 | 6/2020 | Marmann et al. | |
| 2021/0324532 | A1 | 10/2021 | Nakagawa et al. | |
| 2025/0290218 | A1 * | 9/2025 | Ueno | C25D 5/14 |

FOREIGN PATENT DOCUMENTS

| | | | |
|---|---|---|---|
| JP | S5735699 | A | 2/1982 |
| JP | S58110695 | A | 7/1983 |
| JP | H1129897 | A | 2/1999 |
| JP | H11117085 | A | 4/1999 |
| JP | 2007231394 | A | 9/2007 |
| JP | 2008050486 | A | 3/2008 |
| JP | 2009035806 | A | 2/2009 |
| JP | 2013144753 | A | 7/2013 |
| JP | 2014513214 | A | 5/2014 |
| JP | 2016505708 | A | 2/2016 |
| JP | 2020109205 | A | 7/2020 |
| JP | 2020200533 | A | 12/2020 |
| TW | 201217577 | A1 | 5/2012 |
| WO | 2007129979 | A1 | 11/2007 |
| WO | 2015177315 | A1 | 11/2015 |
| WO | 2021214391 | A1 | 10/2021 |

OTHER PUBLICATIONS

May 26, 2025, the Partial Supplementary European Search Report issued by the European Patent Office in the corresponding European Patent Application No. 23784545.8.

Apr. 25, 2023, International Search Report issued in the International Patent Application No. PCT/JP2023/006070.

Oct. 3, 2023, Office Action issued by the Taiwan Intellectual Property Office in the corresponding Taiwanese Patent Application No. 112107246 with English language Search Report.

Alpha-Measure, "Specifications of Deionized Water", accessed Jul. 2, 2024, https://alpha-measure.com/deionized-water-conductivity/ (Year: 2024).

* cited by examiner

SURFACE-TREATED STEEL SHEET AND METHOD OF PRODUCING SAME

TECHNICAL FIELD

The present disclosure relates to a surface-treated steel sheet, and in particular to a surface-treated steel sheet that is excellent in adhesion to BPA-free paint and BPA-free painting corrosion resistance. The surface-treated steel sheet according to the present disclosure is suitable for use for containers such as cans. The present disclosure also relates to a method of producing the surface-treated steel sheet.

BACKGROUND

Steel sheets such as Sn coated steel sheets (tinplate), tin-free steel sheets (TFS), and Ni coated steel sheets have been widely used as materials for various metal cans such as beverage cans, food cans, pails, and 18-liter cans.

In the case of using these steel sheets as materials for metal cans, organic resin coatings such as epoxy-based paint are applied to the surfaces of the steel sheets in order to accommodate various contents. When applying an organic resin coating to a steel sheet, a Cr (chromium) oxide layer formed on the outermost surface of the steel sheet by subjecting the steel sheet to electrolysis treatment or immersion treatment in an aqueous solution containing hexavalent Cr plays an important role. In detail, the Cr oxide layer achieves excellent adhesion to the organic resin coating layer, as a result of which corrosion resistance to various contents is ensured (PTL 1 to PTL 5).

Meanwhile, given the indication that bisphenol A (BPA) contained in epoxy-based paint may be harmful to humans, development of BPA-free paint using polyester-based resins not containing BPA is underway (PTL 6 and PTL 7), and there is a demand to replace epoxy-based paint with BPA-free paint. However, steel sheets that have been used for cans, such as tinplate, TFS, and Ni coated steel sheets, have poor adhesion to BPA-free paint compared to epoxy-based paint, and therefore sufficient corrosion resistance to various contents cannot be ensured. Hence, the application of BPA-free paint to various metal cans has not progressed.

In recent years, growing environmental awareness has accelerated the worldwide trend toward restricting the use of hexavalent Cr. In the field of surface-treated steel sheets used for various metal cans, too, there is a need to establish a production method that does not use hexavalent chromium.

As a method of forming a surface-treated steel sheet without using hexavalent chromium, for example, the method proposed in PTL 8 is known. This method forms a surface-treatment layer by performing electrolysis treatment in an electrolyte containing a trivalent chromium compound such as basic chromium sulfate.

CITATION LIST

Patent Literature

PTL 1: JP S58-110695 A
PTL 2: JP S55-134197 A
PTL 3: JP S57-035699 A
PTL 4: JP H11-117085 A
PTL 5: JP 2007-231394 A
PTL 6: JP 2013-144753 A

PTL 7: JP 2008-050486 A
PTL 8: JP 2016-505708 A

SUMMARY

Technical Problem

With the method proposed in PTL 8, a surface-treatment layer can be formed without using hexavalent chromium. According to PTL 8, a surface-treated steel sheet with excellent adhesion to epoxy-based paint can be obtained by the method.

However, while the surface-treated steel sheet obtained by the conventional method proposed in PTL 8 has excellent adhesion to epoxy-based paint, its adhesion to BPA-free paint is poor. The BPA-free painting corrosion resistance of the surface-treated steel sheet is therefore insufficient. This makes it impossible to replace epoxy-based paint with BPA-free paint while maintaining corrosion resistance to various contents.

There is thus a demand for a surface-treated steel sheet that can be produced without using hexavalent chromium and has excellent adhesion to BPA-free paint and excellent BPA-free painting corrosion resistance.

It could therefore be helpful to provide a surface-treated steel sheet that can be produced without using hexavalent chromium and is excellent in adhesion to BPA-free paint and BPA-free painting corrosion resistance.

Solution to Problem

Upon careful examination, we discovered the following (1) and (2).

(1) By controlling, in a surface-treated steel sheet including a metallic Cr layer and a Cr oxide layer, the contact angle of ethylene glycol and the total atomic ratio of K, Na, Mg, and Ca adsorbed on the surface to Cr within respective specific ranges, excellent adhesion to BPA-free paint and BPA-free painting corrosion resistance can be imparted to the surface-treated steel sheet.

(2) Such a surface-treated steel sheet can be produced by subjecting the steel sheet to cathodic electrolysis treatment in an electrolyte containing trivalent chromium ions and prepared by a specific method, immersing the steel sheet in the electrolyte for a predetermined time or more, and then performing last (final) water washing using water whose electrical conductivity is a predetermined value or less.

The present disclosure is based on these discoveries. We thus provide the following.

1. A surface-treated steel sheet comprising: a steel sheet; a metallic Cr layer disposed on at least one surface of the steel sheet; and a Cr oxide layer disposed on the metallic Cr layer, the surface-treated steel sheet having: a contact angle of ethylene glycol of 50° or less, and a total atomic ratio of K, Na, Mg, and Ca adsorbed on a surface to Cr of 5.0% or less.
2. The surface-treated steel sheet according to 1., wherein the metallic Cr layer is disposed directly on the surface of the steel sheet, and a Cr coating weight of the metallic Cr layer is 40.0 $mg/m^2$ or more and 500.0 $mg/m^2$ or less per one side of the steel sheet.
3. The surface-treated steel sheet according to 1, or 2., wherein an atomic ratio of Fe to Cr on the surface of the surface-treated steel sheet is 15% or less.
4. The surface-treated steel sheet according to 1., further comprising a Sn layer disposed on at least one side of the steel sheet and under the metallic Cr layer.

5. The surface-treated steel sheet according to 4., wherein a Sn coating weight of the Sn layer is 2.0 $mg/m^2$ or more and 20.0 $g/m^2$ or less per one side of the steel sheet, a Cr coating weight of the metallic Cr layer is 2.0 $mg/m^2$ or more and 500.0 $mg/m^2$ or less per one side of the steel sheet, and a total of the Sn coating weight and the Cr coating weight is 40.0 $mg/m^2$ or more per one side of the steel sheet.
6. The surface-treated steel sheet according to 4, or 5., wherein an atomic ratio of Sn to Cr on the surface of the surface-treated steel sheet is 100% or less.
7. The surface-treated steel sheet according to any one of 4. to 6., further comprising a Ni-containing layer disposed on at least one side of the steel sheet and under the Sn layer.
8. The surface-treated steel sheet according to 7., wherein a Ni coating weight of the Ni-containing layer is 2.0 $mg/m^2$ or more and 2000 $mg/m^2$ or less per one side of the steel sheet.
9. The surface-treated steel sheet according to 1., further comprising a Ni-containing layer disposed on at least one side of the steel sheet and under the metallic Cr layer.
10. The surface-treated steel sheet according to 9., wherein a Ni coating weight of the Ni-containing layer is 2.0 $mg/m^2$ or more and 2000.0 $mg/m^2$ or less per one side of the steel sheet, a Cr coating weight of the metallic Cr layer is 2.0 $mg/m^2$ or more and 500.0 $mg/m^2$ or less per one side of the steel sheet, and a total of the Ni coating weight and the Cr coating weight is 40.0 $mg/m^2$ or more per one side of the steel sheet.
11. The surface-treated steel sheet according to 9, or 10., wherein an atomic ratio of Ni to Cr on the surface of the surface-treated steel sheet is 100% or less.
12. The surface-treated steel sheet according to any one of 1. to 11., wherein a Cr coating weight of the Cr oxide layer is 0.1 $mg/m^2$ or more and 15.0 $mg/m^2$ or less per one side of the steel sheet.
13. A method of producing a surface-treated steel sheet that includes: a steel sheet; a metallic Cr layer disposed on at least one surface of the steel sheet; and a Cr oxide layer disposed on the metallic Cr layer, the method comprising: an electrolyte preparation process of preparing an electrolyte containing trivalent chromium ions; a cathodic electrolysis treatment process of subjecting the steel sheet to cathodic electrolysis treatment in the electrolyte; an immersing process of immersing the steel sheet after the cathodic electrolysis treatment in the electrolyte for 1.0 second or more and 5.0 seconds or less electrolessly; and a water washing process of at least one water wash of the steel sheet after the cathodic electrolysis treatment, wherein, in the electrolyte preparation process, the electrolyte is prepared by: mixing a trivalent chromium ion source, a carboxylic acid compound, and water; and adjusting the pH to 4.0 to 7.0 and adjusting the temperature to 40° C. to 70° C., and in the water washing process, water having an electrical conductivity of 100 μS/m or less is used in at least last water wash.
14. The method of producing a surface-treated steel sheet according to 13., wherein the surface-treated steel sheet further includes a Sn layer disposed under the metallic Cr layer.
15. The method of producing a surface-treated steel sheet according to 14., wherein the surface-treated steel sheet further includes a Ni-containing layer disposed under the Sn layer.
16. The method of producing a surface-treated steel sheet according to 13., wherein the surface-treated steel sheet further includes a Ni-containing layer disposed under the metallic Cr layer.

Advantageous Effect

It is thus possible to provide a surface-treated steel sheet excellent in adhesion to BPA-free paint and BPA-free painting corrosion resistance without using hexavalent chromium. The surface-treated steel sheet is suitable for use as a material for containers and the like.

DETAILED DESCRIPTION

A method for carrying out the present disclosure will be described in detail below. The following description shows an example of a preferred embodiment of the present disclosure, and the present disclosure is not limited to such.

A surface-treated steel sheet in one embodiment of the present disclosure is a surface-treated steel sheet comprising: a steel sheet; a metallic Cr layer disposed on at least one surface of the steel sheet; and a Cr oxide layer disposed on the metallic Cr layer. In the present disclosure, it is important that, the surface-treated steel sheet has the contact angle of ethylene glycol of 50° or less and the total atomic ratio of K, Na, Mg, and Ca adsorbed on a surface to Cr of 5.0% or less. Each of the components in the surface-treated steel sheet will be described below.

[Steel Sheet]

The steel sheet is not limited and any steel sheet may be used. The steel sheet is preferably a steel sheet for cans. As the steel sheet, for example, an ultra low carbon steel sheet or a low carbon steel sheet may be used. The method of producing the steel sheet is not limited, and a steel sheet produced by any method may be used. Typically, a cold-rolled steel sheet may be used as the steel sheet. The cold-rolled steel sheet can be produced, for example, by a typical production process that includes hot rolling, pickling, cold rolling, annealing, and temper rolling.

The chemical composition of the steel sheet is not limited, but the Cr content is preferably 0.10 mass % or less and more preferably 0.08 mass % or less. If the Cr content in the steel sheet is within this range, excessive concentration of Cr on the surface of the steel sheet is prevented, and a dense metallic Cr layer and Cr oxide layer can be formed in the below-described cathodic electrolysis treatment process without hindering the formation of the metallic Cr layer and the Cr oxide layer. This contributes to improving BPA-free painting corrosion resistance. Moreover, if the Cr content in the steel sheet is within this range, the atomic ratio of Fe to Cr on the surface of the finally obtained surface-treated steel sheet can be 15% or less in the case where the metallic Cr layer is disposed directly on the steel sheet, the atomic ratio of Sn to Cr on the surface of the finally obtained surface-treated steel sheet can be 100% or less in the case where a Sn layer is provided under the metallic Cr layer, and the atomic ratio of Ni to Cr on the surface of the finally obtained surface-treated steel sheet can be 100% or less in the case where a Ni-containing layer is provided under the metallic Cr layer. The steel sheet may further contain C, Mn, P, S, Si, Cu, Ni, Mo, Al, and inevitable impurities within such ranges that do not undermine the effects according to the present disclosure. In this case, for example, a steel sheet having a chemical composition specified in ASTM A623M-09 can be suitably used as the steel sheet.

In one embodiment of the present disclosure, it is preferable to use a steel sheet having a chemical composition containing, in mass %, C: 0.0001% to 0.13%,
Si: 0% to 0.020%,
Mn: 0.01% to 0.60%,
P: 0% to 0.020%,
S: 0% to 0.030%,
Al: 0% to 0.20%,
N: 0% to 0.040%,
Cu: 0% to 0.20%,
Ni: 0% to 0.15%,
Cr: 0% to 0.10%,
Mo: 0% to 0.05%,
Ti: 0% to 0.020%,
Nb: 0% to 0.020%,
B: 0% to 0.020%,
Ca: 0% to 0.020%,
Sn: 0% to 0.020%, and
Sb: 0% to 0.020%, with the balance consisting of Fe and inevitable impurities. In the chemical composition, Si, P, S, Al, and N are components whose contents are preferably as low as possible, and Cu, Ni, Cr, Mo, Ti, Nb, B, Ca, Sn, and Sb are components that may be added optionally.

The sheet thickness of the steel sheet is not limited, but is preferably 0.60 mm or less. Herein, the term "steel sheet" is defined to include "steel strip". No lower limit is placed on the sheet thickness, but the sheet thickness is preferably 0.10 mm or more.

[Metallic Cr Layer]

The metallic Cr layer is disposed on at least one side of the steel sheet.

The coating weight of the metallic Cr layer is not limited and may be any value. If the coating weight of the metallic Cr layer is excessively high, however, cohesive fracture may occur in the metallic Cr layer, causing degradation in adhesion to BPA-free paint. Therefore, from the viewpoint of more stably ensuring adhesion to BPA-free paint and BPA-free painting corrosion resistance, the Cr coating weight of the metallic Cr layer per one side of the steel sheet is preferably 500.0 mg/$m^2$ or less and more preferably 450.0 mg/$m^2$ or less.

No lower limit is placed on the coating weight of the metallic Cr layer, but a higher Cr coating weight of the metallic Cr layer per one side of the steel sheet is more preferable from the viewpoint of further improving BPA-free painting corrosion resistance. Specifically, the Cr coating weight of the metallic Cr layer per one side of the steel sheet is preferably 2.0 mg/$m^2$ or more and more preferably 5.0 mg/$m^2$ or more. In the case where the metallic Cr layer is disposed directly on the steel sheet, that is, in the case where neither of the below-described Sn layer and Ni-containing layer is provided, the Cr coating weight of the metallic Cr layer per one side of the steel sheet is more preferably 40.0 mg/$m^2$ or more and further preferably 50.0 mg/$m^2$ or more.

The Cr coating weight of the metallic Cr layer can be measured by an X-ray fluorescence method. Specifically, first, the Cr amount (total Cr amount) in the surface-treated steel sheet is measured using an X-ray fluorescence instrument. Next, the surface-treated steel sheet is subjected to alkali treatment of immersing in 7.5N—NaOH at 90° C. for 10 minutes, and then thoroughly washed with water. After this, the Cr amount (the Cr amount after alkali treatment) is measured again using the X-ray fluorescence instrument. Furthermore, the Cr amount (blank sheet Cr amount) in the steel sheet from which the metallic Cr layer and the Cr oxide layer have been peeled off is measured using the X-ray fluorescence instrument. For example, a commercially available chromium coating separating agent such as a hydrochloric acid-based agent may be used to peel off the metallic Cr layer and the Cr oxide layer. The value obtained by subtracting the blank sheet Cr amount from the Cr amount after alkali treatment is taken to be the Cr coating weight of the metallic Cr layer per one side of the steel sheet. The total Cr amount is used to calculate the Cr coating weight of the Cr oxide layer described later.

The metallic Cr constituting the metallic Cr layer may be amorphous Cr or crystalline Cr. In other words, the metallic Cr layer can contain one or both of amorphous Cr and crystalline Cr. The metallic Cr layer produced by the below-described method usually contains amorphous Cr, and may also contain crystalline Cr. The mechanism by which the metallic Cr layer is formed is unclear, but it is presumed that, during formation of amorphous Cr, the amorphous Cr is partially crystallized and as a result a metallic Cr layer containing both amorphous and crystalline phases is formed.

[Cr Oxide Layer]

The Cr oxide layer is disposed on the metallic Cr layer. The coating weight of the Cr oxide layer is not limited and may be any value. From the viewpoint of further improving BPA-free painting corrosion resistance, the coating weight of the Cr oxide layer is preferably 0.1 mg/$m^2$ or more in terms of Cr coating weight per one side of the steel sheet. Although no upper limit is placed on the coating weight of the Cr oxide layer, if the coating weight of the Cr oxide layer is excessively high, cohesive fracture may occur in the Cr oxide layer, causing degradation in adhesion to BPA-free paint. Accordingly, from the viewpoint of improving adhesion to BPA-free paint and ensuring BPA-free painting corrosion resistance more stably, the Cr coating weight of the Cr oxide layer is preferably 15.0 mg/$m^2$ or less. The Cr coating weight of the Cr oxide layer can be measured by an X-ray fluorescence method. Specifically, subtracting the Cr amount after alkali treatment from the total Cr amount measured using the foregoing X-ray fluorescence instrument can yield the Cr coating weight of the Cr oxide layer.

One or both of the metallic Cr layer and the Cr oxide layer may contain C. If the C content in the metallic Cr layer and the Cr oxide layer is excessively high, however, the heat-affected zone may harden during welding and crack. Accordingly, the C content in the metallic Cr layer is preferably 50% or less and more preferably 45% or less in terms of atomic ratio to Cr. Likewise, the C content in the Cr oxide layer is preferably 50% or less and more preferably 45% or less in terms of atomic ratio to Cr. The metallic Cr layer and the Cr oxide layer may not contain C. Thus, no lower limit is placed on the atomic ratio of C to Cr contained in the metallic Cr layer and the Cr oxide layer, and the lower limit may be 0%.

The C content in the metallic Cr layer and the C content in the Cr oxide layer can each be measured by X-ray photoelectron spectroscopy (XPS). Specifically, the C content can be measured by XPS in the following manner. From the integrated intensities of the narrow spectra of Cr2p and C1s measured by XPS, the C atomic ratio and the Cr atomic ratio are determined by the relative sensibility coefficient method, and (the C atomic ratio)/(the Cr atomic ratio) is calculated.

Since contamination-derived C is detected from the outermost layer of the surface-treated steel sheet, in order to accurately measure the C content in the Cr oxide layer, sputtering may be performed from the outermost layer to a depth of, for example, 0.2 nm or more in terms of $SiO_2$ before the measurement. The C content in the metallic Cr layer may be measured after performing sputtering from the outermost layer after the foregoing alkali treatment to a depth of ½ of the thickness of the metallic Cr layer.

The thickness of the metallic Cr layer used in this measurement can be determined by the following procedure. First, XPS measurement is carried out every 1 nm from the outermost layer after the alkali treatment in the depth direction to measure the Cr atomic ratio and the Ni atomic ratio. Next, a cubic formula that approximates the relationship of (the Ni atomic ratio)/(the Cr atomic ratio) to the depth from the outermost layer after the alkali treatment is obtained by the least squares method. Using the obtained cubic formula, the depth from the outermost layer at which (the Ni atomic ratio)/(the Cr atomic ratio) is 1 is calculated and taken to be the thickness of the metallic Cr layer.

A scanning X-ray photoelectron spectrometer PHI X-tool produced by ULVAC-PHI, Inc. can be used for the measurement, for example. For example, the X-ray source is a monochromatic AlKα ray, the voltage is 15 kV, the beam diameter is 100 μmφ, the extraction angle is 45°, and the sputtering conditions are Ar ions with an acceleration voltage of 1 kV and a sputtering rate of 1.50 nm/min in terms of $SiO_2$.

The mechanism by which C is contained in the metallic Cr layer and the Cr oxide layer is not clear, but it is presumed that, in the process of forming each of the metallic Cr layer and the Cr oxide layer on the steel sheet, the carboxylic acid compound contained in the electrolyte decomposes and is incorporated into the layer.

The form of C in the metallic Cr layer and the Cr oxide layer is not limited. If C exists as a precipitate, however, corrosion resistance may decrease due to the formation of a local battery. Therefore, the sum of the volume fractions of clusters and carbides with a clear crystal structure is preferably 10% or less and more preferably 0% (i.e. such clusters and carbides are not contained at all). Whether carbides are present can be determined, for example, by composition analysis using energy dispersive X-ray spectroscopy (EDS) or wavelength dispersive X-ray spectroscopy (WDS) attached to a scanning electron microscope (SEM) or transmission electron microscope (TEM).

Whether clusters are present can be determined, for example, by cluster analysis on data after three-dimensional composition analysis using a three-dimensional atom probe (3DAP).

The metallic Cr layer may contain O. Although no upper limit is placed on the O content in the metallic Cr layer, if the O content is high, Cr oxide may precipitate and corrosion resistance may decrease due to the formation of a local battery. The O content is therefore preferably 30% or less and more preferably 25% or less in terms of atomic ratio to Cr. The metallic Cr layer may not contain O. Thus, no lower limit is placed on the O content in the metallic Cr layer, and the lower limit may be 0%.

The O content in the metallic Cr layer can be measured by composition analysis using XPS, EDS or WDS attached to a SEM or TEM, or 3DAP.

One or both of the metallic Cr layer and the Cr oxide layer may contain Fe, Sn, and Ni. Although no upper limit is placed on the Fe content, the Sn content, and the Ni content in the metallic Cr layer, the Fe content, the Sn content, and the Ni content in the metallic Cr layer are preferably 100% or less in terms of atomic ratio to Cr. Although no upper limit is placed on the Fe content, the Sn content, and the Ni content in the Cr oxide layer, the Fe content, the Sn content, and the Ni content in the Cr oxide layer are preferably 100% or less in terms of atomic ratio to Cr. The metallic Cr layer and the Cr oxide layer may not contain Fe, Sn, and Ni. Thus, no lower limit is placed on the atomic ratio to Cr, and the lower limit may be 0%.

The Fe content, the Sn content, and the Ni content on the surface of the surface-treated steel sheet, i.e. the surface of the Cr oxide layer, are not limited. Since BPA-free painting corrosion resistance is higher when the Fe content, the Sn content, and the Ni content on the surface of the surface-treated steel sheet, i.e. the surface of the Cr oxide layer, are lower, the lower limit of each of the atomic ratio of Fe to Cr on the surface of the surface-treated steel sheet, the atomic ratio of Sn to Cr on the surface of the surface-treated steel sheet, and the atomic ratio of Ni to Cr on the surface of the surface-treated steel sheet may be 0%, and is most preferably 0%. In the case where the metallic Cr layer is disposed directly on the steel sheet, the atomic ratio of Fe to Cr on the surface of the surface-treated steel sheet is preferably 15% or less and more preferably 10% or less. In the case where a Sn layer is provided under the metallic Cr layer, the atomic ratio of Sn to Cr on the surface of the surface-treated steel sheet is preferably 100% or less and more preferably 80% or less. In the case where a Ni-containing layer is provided under the metallic Cr layer, the atomic ratio of Ni to Cr on the surface of the surface-treated steel sheet is preferably 100% or less and more preferably 80% or less.

The Fe content, the Sn content, and the Ni content in the metallic Cr layer and the Cr oxide layer can be measured by XPS, as with the C content. The atomic ratio of Fe to Cr on the surface of the surface-treated steel sheet, i.e. the surface of the Cr oxide layer, the atomic ratio of Sn to Cr on the surface of the surface-treated steel sheet, i.e. the surface of the Cr oxide layer, and the atomic ratio of Ni to Cr on the surface of the surface-treated steel sheet, i.e. the surface of the Cr oxide layer, can be measured by XPS on the surface of the surface-treated steel sheet. The atomic ratios can be calculated using the narrow spectra of Cr2p, Fe2p, Sn3d, and Ni2p.

The mechanism by which Fe, Sn, and Ni are contained in the metallic Cr layer and the Cr oxide layer is not clear, but it is presumed that, in the process of forming each of the metallic Cr layer and the Cr oxide layer on the steel sheet, Fe, Sn, and Ni contained in the steel sheet, the Sn layer, and the Ni-containing layer dissolve in small amounts into the electrolyte and as a result are incorporated into the layer.

The metallic Cr layer and the Cr oxide layer may contain metal impurities such as Cu and Zn contained in the aqueous solution and S, N, Cl, Br, etc., besides Cr, O, Fe, Sn, Ni, and C and the below-described K, Na, Mg, and Ca. However, the presence of these elements is likely to cause decreases in adhesion to BPA-free paint and BPA-free painting corrosion resistance. Therefore, the total content of elements other than Cr, O, Fe, Sn, Ni, C, K, Na, Mg, and Ca is preferably 3% or less and more preferably 0% (i.e. the other elements are not contained at all) in terms of atomic ratio to Cr. For example, the content of these elements can be measured by XPS as with the C content, without being limited thereto.

The surface roughness of the surface-treated steel sheet according to the present disclosure does not change significantly with the formation of the metallic Cr layer and the Cr oxide layer, and usually is approximately the same as the surface roughness of the steel sheet, Sn layer, or Ni-containing layer located under the metallic Cr layer. The surface roughness of the surface-treated steel sheet is not limited, but the arithmetic mean roughness Ra is preferably 0.1 μm or more and 4 μm or less and the ten point height of roughness profile Rz is preferably 0.2 μm or more and 6 μm or less.

[Contact Angle of Ethylene Glycol]

In the present disclosure, it is important that the surface-treated steel sheet has the contact angle of ethylene glycol of 50° or less. By controlling the surface of the surface-treated steel sheet so that the contact angle of ethylene glycol will be 50° or less, a firm bond is formed between the polyester resin contained in the BPA-free paint and the surface-treated steel sheet, as a result of which high adhesion to the BPA-free paint can be obtained and BPA-free painting corrosion resistance can be improved. From the viewpoint of further improving adhesion to BPA-free paint and BPA-free painting corrosion resistance, the contact angle of ethylene glycol is preferably 48° or less and more preferably 45° or less. Since a lower contact angle is more preferable from the viewpoint of improving adhesion, no lower limit is placed on the contact angle and the lower limit may be 0°. From the viewpoint of ease of production, etc., however, the contact angle of ethylene glycol is preferably 3° or more and more preferably 6° or more.

Moreover, in the present disclosure, the state of the surface of the surface-treated steel sheet, i.e. the surface state of the Cr oxide layer, is stable against heat, and the contact angle of ethylene glycol does not change significantly even after heat treatment equivalent to paint baking, for example. It is presumed that such thermal stability of the surface state also contributes to improving adhesion to BPA-free paint and BPA-free painting corrosion resistance. The contact angle of ethylene glycol of the surface-treated steel sheet after heat treatment equivalent to painting is therefore preferably 50° or less, more preferably 48° or less, and further preferably 45° or less. The contact angle of ethylene glycol of the surface-treated steel sheet after heat treatment equivalent to painting may be 0° or more and is preferably 3° or more and more preferably 6° or more, without being limited thereto. The conditions of the heat treatment equivalent to painting are not limited, and may be 200° C. and 10 minutes, for example.

The method of measuring the contact angle of ethylene glycol is not limited, and the contact angle of ethylene glycol may be measured, for example, using an automatic contact angle meter CA-VP model produced by Kyowa Interface Science Co., Ltd. Specifically, 2 μl of ethylene glycol is dropped onto the surface of the surface-treated steel sheet and, after 1 second, the contact angle is measured by the θ/2 method. The surface temperature of the surface-treated steel sheet during measurement is 20° C.±1° C., and the temperature of the ethylene glycol is 20° C.±1° C. As the ethylene glycol, special grade chemical ethylene glycol produced by Fujifilm Wako Pure Chemical Corporation may be used. The arithmetic mean value of the contact angles for five drops is calculated and taken to be the contact angle of ethylene glycol.

The surface of the surface-treated steel sheet may be coated with rust preventive oil such as CSO, DOS, DOS-A, or ATBC. In the case where the surface-treated steel sheet is coated with oil, the oil is vaporized by performing heat treatment equivalent to painting at 200° C. for 10 minutes before measuring the contact angle of ethylene glycol by the foregoing method. Since the surface-treated steel sheet according to the present disclosure is stable against heat treatment as mentioned above, the measurement is not affected by the heat treatment. Although additive components such as rust-preventive agents contained in the oil may remain on the surface of the surface-treated steel sheet even after heat treatment equivalent to painting, their amounts are so small that the contact angle of ethylene glycol and the adsorption amount of the adsorbed elements mentioned above are not affected and adhesion to BPA-free paint and BPA-free painting corrosion resistance do not degrade.

The mechanism by which the contact angle of ethylene glycol of the surface-treated steel sheet is 50° or less is not clear, but it is presumed that, as a result of forming a metallic Cr layer and a Cr oxide layer through cathodic electrolysis in an electrolyte prepared by a certain method and then immersing the steel sheet in the electrolyte for a predetermined time or more, the surface of the surface-treated steel sheet, i.e. the surface of the Cr oxide layer, is modified through some kind of dissolution reaction or the like so that the contact angle of ethylene glycol will be 50° or less. Here, in the case where the electrolyte is not prepared under specific conditions as described later, the surface of the surface-treated steel sheet does not have a contact angle of ethylene glycol of 50° or less even when the steel sheet is immersed in the electrolyte for the predetermined time or more after cathodic electrolysis.

It has been reported that, in conventional surface-treated steel sheets produced using a hexavalent chromium bath as proposed in PTL 1 to PTL 5, the composition of the hydrated chromium oxide layer present in the surface layer greatly affects adhesion to epoxy-based paint in a wet environment. In a wet environment, water that has penetrated the epoxy-based painting layer hinders adhesion at the interface between the epoxy-based painting layer and the hydrated chromium oxide layer. Thus, in the case where a large number of hydrophilic OH groups are present in the hydrated chromium oxide layer, spreading wetting of water at the interface is promoted and adhesive strength decreases. In view of this, in the conventional surface-treated steel sheets, adhesion to epoxy-based paint in a wet environment is improved by reducing the number of OH groups through the progression of oxidization of hydrated chromium oxide, i.e. by hydrophobizing the surface.

We focused attention on ethylene glycol instead of water, and found that firm adhesion to BPA-free paint can be ensured by adjusting the surface to have a high affinity for ethylene glycol. The present disclosure is thus based on the technical concept that is completely different from the foregoing conventional techniques. The mechanism by which adhesion to BPA-free paint is improved by adjusting the surface to have a high affinity for ethylene glycol is not clear, but it is presumed that, since ethylene glycol is one of the hydroxyl group monomers that are components of polyester resin contained in BPA-free paint, adjusting the surface to have a high affinity for ethylene glycol improves adhesion to BPA-free paint.

[Atomic Ratio of Adsorbed Elements]

The surface-treated steel sheet according to the present disclosure has a contact angle of ethylene glycol of 50° or less and has a chemically active surface, as mentioned above. Hence, cations of elements such as K, Na, Mg, and Ca tend to be adsorbed on the surface of the surface-treated steel sheet. We found that simply setting the contact angle of ethylene glycol to 50° or less cannot achieve proper adhesion due to the influence of the adsorbed cations. In the present disclosure, by reducing the amount of the cations adsorbed on the surface of the surface-treated steel sheet, it is possible to improve adhesion to BPA-free paint and achieve excellent BPA-free painting corrosion resistance.

Specifically, the surface-treated steel sheet has the sum of the atomic ratio of K, Na, Mg, and Ca adsorbed on the surface to Cr of 5.0% or less, preferably 3.0% or less, and more preferably 1.0% or less. Since a lower total atomic ratio is better, no lower limit is placed on the total atomic ratio and the lower limit may be 0%. The total atomic ratio can be measured by the method described in the EXAMPLES section.

[Sn Layer]

The surface-treated steel sheet may optionally further include a Sn layer under the metallic Cr layer. For example, the surface-treated steel sheet in one embodiment of the present disclosure may be a surface-treated steel sheet comprising: a steel sheet; a Sn layer disposed on at least one surface of the steel sheet; a metallic Cr layer disposed on the Sn layer; and a Cr oxide layer disposed on the metallic Cr layer. The Sn layer may be provided on at least one side of the steel sheet, and may be provided on both sides of the steel sheet. The Sn layer may cover at least part of the steel sheet, and may cover the entire surface on which the Sn layer is provided. The Sn layer may be a continuous layer or a discontinuous layer. An example of the discontinuous layer is a layer having an island structure.

The term “Sn layer” herein includes a Sn layer that has been partially alloyed. For example, the term “Sn layer” includes a Sn layer part of which has been made into a Sn alloy layer as a result of heating and melting treatment after Sn coating or plating. Examples of the Sn alloy layer include a Fe—Sn alloy layer and a Fe—Sn—Ni alloy layer.

For example, by heating and melting Sn through electrical resistance heating or the like after Sn coating or plating, part of the Sn layer on the steel sheet side can be made into a Fe—Sn alloy layer. For example, by performing Sn coating or plating on a steel sheet having a Ni layer at its surface and further heating and melting Sn through electrical resistance heating or the like, part of the Sn layer on the steel sheet side can be made into one or both of a Fe—Sn—Ni alloy layer and a Fe—Sn alloy layer.

The Sn coating weight of the Sn layer is not limited and may be any value. From the viewpoint of further improving the BPA-free painting corrosion resistance of the surface-treated steel sheet, the Sn coating weight is preferably 2.0 $mg/m^2$ or more and more preferably 5.0 $mg/m^2$ or more per one side of the steel sheet. If the Sn coating weight is more than 20.0 $g/m^2$, the effect of improving BPA-free painting corrosion resistance is saturated. Accordingly, from the viewpoint of reducing excessive costs, the Sn coating weight is preferably 20.0 $g/m^2$ or less and more preferably 18.0 $g/m^2$ or less. From the viewpoint of further improving the BPA-free painting corrosion resistance of the surface-treated steel sheet, the total of the Sn coating weight of the Sn layer and the Cr coating weight of the metallic Cr layer is preferably 40.0 $mg/m^2$ or more and more preferably 45.0 $mg/m^2$ or more per one side of the steel sheet. The total of the Sn coating weight of the Sn layer and the Cr coating weight of the metallic Cr layer is preferably 20.0 $g/m^2$ or less per one side of the steel sheet.

The Sn coating weight is measured by, for example, the electrolytic method or the X-ray fluorescence method described in JIS G 3303.

The formation of the Sn layer is not limited and may be performed by any method such as electroplating or hot-dip coating. In the case of forming the Sn layer by electroplating, any plating bath may be used. Examples of plating baths that can be used include a phenolsulfonic acid Sn plating bath, a methanesulfonic acid Sn plating bath, and a halogen-based Sn plating bath.

Reflow treatment may be performed after the Sn layer is formed. In the case of performing the reflow treatment, heating the Sn layer to a temperature higher than or equal to the melting point of Sn (231.9° C.) can form an alloy layer such as a Fe—Sn alloy layer under (on the steel sheet side of) the Sn single coating layer. In the case of not performing the reflow treatment, a Sn coated steel sheet including a Sn single coating layer is obtained.

[Ni-Containing Layer]

The surface-treated steel sheet may optionally further include a Ni-containing layer under the Sn layer. For example, the surface-treated steel sheet in one embodiment of the present disclosure may be a surface-treated steel sheet comprising: a steel sheet; a Ni-containing layer disposed on at least one surface of the steel sheet; a Sn layer disposed on the Ni-containing layer; a metallic Cr layer disposed on the Sn layer; and a Cr oxide layer disposed on the metallic Cr layer.

The Ni-containing layer may be provided on at least one side of the steel sheet, and may be provided on both sides of the steel sheet. The Ni-containing layer may cover at least part of the steel sheet, and may cover the entire surface on which the Ni-containing layer is provided. The Ni-containing layer may be a continuous layer or a discontinuous layer. An example of the discontinuous layer is a layer having an island structure.

As the Ni-containing layer, any layer containing nickel may be used. For example, one or both of a Ni layer and a Ni alloy layer may be used. The term “Ni-containing layer” herein includes, for example, a Ni alloy layer resulting from diffusion annealing treatment after Ni coating or plating. An example of the Ni alloy layer is a Ni—Fe alloy layer. Moreover, by forming the Sn layer on the Ni-containing layer and then performing reflow treatment, a Fe—Sn—Ni alloy layer, a Fe—Sn alloy layer, or the like can be formed under (i.e. on the steel sheet side of) the Sn single coating layer.

The Ni-containing layer is preferably a Ni-based coating layer. The term “Ni-based coating layer” herein is defined as a coating layer having a Ni content of 50 mass % or more. In other words, the Ni-based coating layer is a Ni coating layer or a coating layer made of a Ni-based alloy.

The Ni-based coating layer may be a dispersed coating layer (composite coating layer) in which solid fine particles are dispersed in Ni or a Ni-based alloy as a matrix. The solid fine particles are not limited and fine particles of any material may be used. The fine particles may be any of inorganic fine particles and organic fine particles. Examples of the organic fine particles include fine particles made of resin. The resin may be any resin, but is preferably fluororesin and more preferably polytetrafluoroethylene (PTFE). The inorganic fine particles are not limited and fine particles made of any inorganic material may be used. For example, the inorganic material may be a metal (including an alloy), a compound, or any other simple substance. Among these, fine particles made of at least one selected from the group consisting of oxides, nitrides, and carbides are preferably used, and fine particles of a metal oxide are more preferably used. Examples of the metal oxide include aluminum oxide, chromium oxide, titanium oxide, and zinc oxide.

The particle size of the fine particles used in the dispersed coating is not limited and particles of any size may be used. It is, however, preferable that the diameter of the fine particles does not exceed the thickness of the dispersed coating layer as the Ni-containing layer. Typically, the diameter of the fine particles is preferably 1 nm to 50 μm and more preferably 10 nm to 1000 nm.

The Ni coating weight of the Ni-containing layer is not limited and may be any value. From the viewpoint of further improving the BPA-free painting corrosion resistance of the surface-treated steel sheet, the Ni coating weight is preferably 2.0 $mg/m^2$ or more and more preferably 5.0 $mg/m^2$ or more per one side of the steel sheet. If the Ni coating weight is more than 2000 $mg/m^2$, the effect of improving BPA-free painting corrosion resistance is saturated. Accordingly, from the viewpoint of reducing excessive costs, the Ni coating weight is preferably 2000 $mg/m^2$ or less and more preferably 1800 $mg/m^2$ or less.

The formation of the Ni-containing layer is not limited and may be performed by any method such as electroplating. In the case of forming the Ni-containing layer by electroplating, any plating bath may be used. Examples of plating baths that can be used include a Watts bath, a sulfamic acid bath, and a Wood's bath. In the case of forming a Ni—Fe alloy layer as the Ni-containing layer, the Ni—Fe alloy layer can be formed by forming a Ni layer on the surface of the steel sheet by a method such as electroplating and then annealing it.

The Ni-containing layer may or may not contain Ni oxide on its surface side. From the viewpoint of further improving paint secondary adhesion and sulfide staining resistance, the Ni-containing layer preferably does not contain Ni oxide on its surface side. While Ni oxide can also be formed by, for example, dissolved oxygen contained in the wash water after Ni coating or plating, it is preferable to remove Ni oxide contained in the Ni-containing layer by the below-described pretreatment, etc.

The surface-treated steel sheet may optionally further include a Ni-containing layer under the metallic Cr layer. For example, the surface-treated steel sheet in one embodiment of the present disclosure may be a surface-treated steel sheet comprising: a steel sheet; a Ni-containing layer disposed on at least one surface of the steel sheet; a metallic Cr layer disposed on the Ni-containing layer; and a Cr oxide layer disposed on the metallic Cr layer. The Ni-containing layer may be provided on at least one side of the steel sheet, and may be provided on both sides of the steel sheet. The Ni-containing layer may cover at least part of the steel sheet, and may cover the entire surface on which the Ni-containing layer is provided. The Ni-containing layer may be a continuous layer or a discontinuous layer. An example of the discontinuous layer is a layer having an island structure.

As the Ni-containing layer, any layer containing nickel may be used. For example, one or both of a Ni layer and a Ni alloy layer may be used. The term "Ni-containing layer" herein includes, for example, a Ni alloy layer resulting from diffusion annealing treatment after Ni coating or plating. An example of the Ni alloy layer is a Ni—Fe alloy layer.

The Ni-containing layer is preferably a Ni-based coating layer. The term "Ni-based coating layer" herein is defined as a coating layer having a Ni content of 50 mass % or more. In other words, the Ni-based coating layer is a Ni coating layer or a coating layer made of a Ni-based alloy.

The Ni-based coating layer may be a dispersed coating layer (composite coating layer) in which solid fine particles are dispersed in Ni or a Ni-based alloy as a matrix. The solid fine particles are not limited and fine particles of any material may be used. The fine particles may be any of inorganic fine particles and organic fine particles. Examples of the organic fine particles include fine particles made of resin. The resin may be any resin, but is preferably fluororesin and more preferably polytetrafluoroethylene (PTFE). The inorganic fine particles are not limited and fine particles made of any inorganic material may be used. For example, the inorganic material may be a metal (including an alloy), a compound, or any other simple substance. Among these, fine particles made of at least one selected from the group consisting of oxides, nitrides, and carbides are preferably used, and fine particles of a metal oxide are more preferably used. Examples of the metal oxide include aluminum oxide, chromium oxide, titanium oxide, and zinc oxide.

The particle size of the fine particles used in the dispersed coating is not limited and particles of any size may be used. It is, however, preferable that the diameter of the fine particles does not exceed the thickness of the dispersed coating layer as the Ni-containing layer. Typically, the diameter of the fine particles is preferably 1 nm to 50 μm and more preferably 10 nm to 1000 nm.

The Ni coating weight of the Ni-containing layer is not limited and may be any value. From the viewpoint of further improving the BPA-free painting corrosion resistance of the surface-treated steel sheet, the Ni coating weight is preferably 2.0 $mg/m^2$ or more and more preferably 5.0 $mg/m^2$ or more per one side of the steel sheet. If the Ni coating weight is more than 2000 $mg/m^2$, the effect of improving BPA-free painting corrosion resistance is saturated. Accordingly, from the viewpoint of reducing excessive costs, the Ni coating weight is preferably 2000 $mg/m^2$ or less and more preferably 1800 $mg/m^2$ or less. From the viewpoint of further improving the BPA-free painting corrosion resistance of the surface-treated steel sheet, the total of Ni coating weight of the Ni-containing layer and the Cr coating weight of the metallic Cr layer is preferably 40.0 $mg/m^2$ or more and more preferably 50.0 $mg/m^2$ or more per one side of the steel sheet. The total of the Ni coating weight of the Ni-containing layer and the Cr coating weight of the metallic Cr layer is preferably 2000 $mg/m^2$ or less per one side of the steel sheet.

The Ni coating weight of the Ni-containing layer is measured by a calibration curve method using fluorescent X-rays. A plurality of steel sheets whose Ni coating weights are known are prepared. The fluorescent X-ray intensity derived from Ni is measured in advance, and the relationship between the measured fluorescent X-ray intensities and the Ni coating weights is linearly approximated to obtain a calibration curve. The fluorescent X-ray intensity derived from Ni in the surface-treated steel sheet is measured. The Ni coating weight of the Ni-containing layer can then be measured using the calibration curve.

The formation of the Ni-containing layer is not limited and may be performed by any method such as electroplating. In the case of forming the Ni-containing layer by electroplating, any plating bath may be used. Examples of plating baths that can be used include a Watts bath, a sulfamic acid bath, and a Wood's bath. In the case of forming a Ni—Fe alloy layer as the Ni-containing layer, the Ni—Fe alloy layer can be formed by forming a Ni layer on the surface of the steel sheet by a method such as electroplating and then annealing it.

The Ni-containing layer may or may not contain Ni oxide on its surface side. From the viewpoint of further improving paint secondary adhesion and sulfide staining resistance, the Ni-containing layer preferably does not contain Ni oxide on its surface side. While Ni oxide can also be formed by, for example, dissolved oxygen contained in the wash water after Ni coating or plating, it is preferable to remove Ni oxide contained in the Ni-containing layer by the below-described pretreatment, etc.

[Production method]

In a method of producing a surface-treated steel sheet according to one embodiment of the present disclosure, a surface-treated steel sheet having the above-described properties can be produced by the method described below.

The method of producing a surface-treated steel sheet according to one embodiment of the present disclosure is a method of producing a surface-treated steel sheet including: a steel sheet; a metallic Cr layer disposed on at least one surface of the steel sheet; and a Cr oxide layer disposed on the metallic Cr layer, and comprises the following processes (1) to (4):

(1) an electrolyte preparation process of preparing an electrolyte containing trivalent chromium ions;

(2) a cathodic electrolysis treatment process of subjecting a steel sheet to cathodic electrolysis treatment in the electrolyte;

(3) an immersion process of immersing the steel sheet after the cathodic electrolysis treatment in the electrolyte for a predetermined time or more; and (4) a water washing process of at least one water wash of the steel sheet after the immersion process.

Each of the processes will be described below.

[Electrolyte Preparation Process] (i)

Mixing

In the electrolyte preparation process, first, a trivalent chromium ion source, a carboxylic acid compound, and water are mixed to prepare an aqueous solution.

As the trivalent chromium ion source, any compound that can supply trivalent chromium ions may be used. As the trivalent chromium ion source, for example, at least one selected from the group consisting of chromium chloride, chromium sulfate, and chromium nitrate may be used.

The content of the trivalent chromium ion source in the aqueous solution is not limited, but is preferably 3 g/L or more and 50 g/L or less and more preferably 5 g/L or more and 40 g/L or less in terms of trivalent chromium ions. As the trivalent chromium ion source, BluCr® (BluCr is a registered trademark in Japan, other countries, or both) TFS A produced by Atotech can be used.

The carboxylic acid compound is not limited and any carboxylic acid compound may be used. The carboxylic acid compound may be at least one of a carboxylic acid and a carboxylate, and is preferably at least one of an aliphatic carboxylic acid and an aliphatic carboxylate. The carbon number of the aliphatic carboxylic acid is preferably 1 to 10 and more preferably 1 to 5. The carbon number of the aliphatic carboxylate is preferably 1 to 10 and more preferably 1 to 5. The content of the carboxylic acid compound is not limited, but is preferably 0.1 mol/L or more and 5.5 mol/L or less and more preferably 0.15 mol/L or more and 5.3 mol/L or less. As the carboxylic acid compound, BluCr® TFS B produced by Atotech can be used.

In the present disclosure, water is used as a solvent for preparing the electrolyte. As the water, it is preferable to use high-purity water such as distilled water or ion-exchanged water from which cations have been removed in advance using an ion-exchange resin. From the viewpoint of reducing the amount of K, Na, Mg, and Ca contained in the electrolyte, it is preferable to use water with an electrical conductivity of 30 μS/m or less, as described later.

In order to reduce K, Na, Mg, and Ca adsorbed on the surface of the surface-treated steel sheet, it is preferable not to intentionally add K, Na, Mg, and Ca to the aqueous solution. It is therefore preferable that the components added to the aqueous solution, such as the above-described trivalent chromium ion source and carboxylic acid compound and the below-described pH adjuster, do not contain K, Na, Mg, and Ca. As the pH adjuster, it is preferable to use hydrochloric acid, sulfuric acid, nitric acid, etc. to decrease the pH, and use ammonia water, etc. to increase the pH. K, Na, Mg, and Ca inevitably mixed into the aqueous solution or the electrolyte are acceptable, but the total concentration of K, Na, Mg, and Ca is preferably 2.0 mol/L or less, more preferably 1.5 mol/L or less, and further preferably 1.0 mol/L or less.

In order to effectively suppress the formation of hexavalent chromium at the anode in the cathodic electrolysis treatment process and improve the stability of the electrolyte, it is preferable that the aqueous solution further contains at least one type of halide ion. The content of the halide ion is not limited, but is preferably 0.05 mol/L or more and 3.0 mol/L or less and more preferably 0.10 mol/L or more and 2.5 mol/L or less. BluCr® TFS Cl and BluCr® TFS C2 produced by Atotech can be used to contain the halide ion.

It is preferable not to add hexavalent chromium to the aqueous solution. The electrolyte does not contain hexavalent chromium, except for an extremely small amount of hexavalent chromium formed at the anode in the cathodic electrolysis treatment process. Since an extremely small amount of hexavalent chromium formed at the anode in the cathodic electrolysis treatment process is reduced to trivalent chromium, the concentration of hexavalent chromium in the electrolyte does not increase.

It is preferable not to intentionally add metal ions other than trivalent chromium ions to the aqueous solution. The metal ions are not limited, and examples thereof include Cu ions, Zn ions, Fe ions, Sn ions, and Ni ions. The content of each of these ions is preferably 0 mg/L or more and 40 mg/L or less, more preferably 0 mg/L or more and 20 mg/L or less, and most preferably 0 mg/L or more and 10 mg/L or less. Of these metal ions, Fe ions, Sn ions, and Ni ions may dissolve in the electrolyte in the cathodic electrolysis treatment process and the immersion process and co-precipitate in the layer (coating), but does not affect adhesion to BPA-free paint and BPA-free painting corrosion resistance. The concentrations of Fe ions, Sn ions, and Ni ions are preferably within the foregoing range at initial make-up of electrolytic bath. It is also preferable to maintain the concentrations of Fe ions, Sn ions, and Ni ions in the electrolyte within the foregoing range in the cathodic electrolysis treatment process and the immersion process. If Fe ions, Sn ions, and Ni ions are controlled within the foregoing range, the formation of a metallic Cr layer and a Cr oxide layer is not hindered and the necessary amounts of a metallic Cr layer and a Cr oxide layer can be formed.

(ii) Adjustment of pH and Temperature

Next, the pH of the aqueous solution is adjusted to 4.0 to 7.0 and the temperature of the aqueous solution is adjusted to 40° C. to 70° C. to prepare the electrolyte. In order to produce the above-described surface-treated steel sheet, simply dissolving the trivalent chromium ion source and the carboxylic acid compound in water is not enough, and it is important to appropriately control the pH and the temperature as described above.

pH: 4.0 to 7.0

In the electrolyte preparation process, the pH of the aqueous solution after mixing is adjusted to 4.0 to 7.0. If the pH is less than 4.0 or more than 7.0, the contact angle of ethylene glycol of the surface-treated steel sheet produced using the obtained electrolyte exceeds 50°. The pH is preferably 4.5 to 6.5.

Temperature: 40° C. to 70° C.

In the electrolyte preparation process, the temperature of the aqueous solution after mixing is adjusted to 40° C. to 70° C. If the temperature is less than 40° C. or more than 70° C., the contact angle of ethylene glycol of the surface-treated steel sheet produced using the obtained electrolyte exceeds 50°. The holding time in the temperature range of 40° C. to 70° C. is not limited.

As a result of this procedure, the electrolyte to be used in the next cathodic electrolysis treatment process can be obtained. The electrolyte produced by this procedure can be stored at room temperature.

[Cathodic Electrolysis Treatment Process]

Next, the steel sheet is subjected to cathodic electrolysis treatment in the electrolyte obtained in the electrolyte preparation process. As a result of the cathodic electrolysis treatment, a metallic Cr layer and a Cr oxide layer can be formed on the steel sheet. In one embodiment of the present disclosure, the surface-treated steel sheet may further include a Sn layer. In the case of producing a surface-treated steel sheet including a Sn layer, a steel sheet having a Sn layer on at least one side is subjected to cathodic electrolysis. In one embodiment of the present disclosure, the surface-treated steel sheet may further include a Ni-containing layer under the Sn layer. In the case of producing a surface-treated steel sheet including a Ni-containing layer under the Sn layer, a steel sheet having a Ni-containing layer on at least one side and a Sn layer disposed on the Ni-containing layer is subjected to cathodic electrolysis. In one embodiment of the present disclosure, the surface-treated steel sheet may further include a Ni-containing layer. In the case of producing a surface-treated steel sheet including a Ni-containing layer, a steel sheet having a Ni-containing layer on at least one side is subjected to cathodic electrolysis.

The temperature of the electrolyte during the cathodic electrolysis treatment is not limited, but is preferably in the temperature range of 40° C. or more and 70° C. or less in order to efficiently form the metallic Cr layer and the Cr oxide layer. From the viewpoint of stably producing the above-described surface-treated steel sheet, it is preferable to monitor the temperature of the electrolyte and maintain the temperature within the foregoing temperature range in the cathodic electrolysis treatment process.

The pH of the electrolyte during the cathodic electrolysis treatment is not limited, but is preferably 4.0 or more and more preferably 4.5 or more. The pH is preferably 7.0 or less and more preferably 6.5 or less. From the viewpoint of stably producing the above-described surface-treated steel sheet, it is preferable to monitor the pH of the electrolyte and maintain the pH within the foregoing pH range in the cathodic electrolysis treatment process.

The current density in the cathodic electrolysis treatment is not limited and may be adjusted appropriately so that the desired surface-treatment layer will be formed. If the current density is excessively high, an excessive load is put on the cathodic electrolytic device. The current density is therefore preferably 200.0 $A/dm^2$ or less and more preferably 100 $A/dm^2$ or less. Although no lower limit is placed on the current density, if the current density is excessively low, hexavalent Cr may form in the electrolyte, causing the stability of the bath to be lost. The current density is therefore preferably 5.0 $A/dm^2$ or more and more preferably 10.0 $A/dm^2$ or more.

The number of times the steel sheet is subjected to cathodic electrolysis treatment is not limited and may be any number. In other words, cathodic electrolysis treatment can be performed using an electrolytic device having any number of passes where the number is one or more. For example, it is preferable to perform cathodic electrolysis treatment continuously by passing the steel sheet (steel strip) through a plurality of passes while conveying it. If the number of times cathodic electrolysis treatment is performed (i.e. the number of passes) is increased, the corresponding number of electrolysis tanks are required. Accordingly, the number of times cathodic electrolysis treatment is performed (i.e. the number of passes) is preferably 20 or less.

The electrolysis time per pass is not limited. If the electrolysis time per pass is excessively long, however, the conveyance speed (line speed) of the steel sheet decreases and productivity decreases. The electrolysis time per pass is therefore preferably 5 seconds or less and more preferably 3 seconds or less. Although no lower limit is placed on the electrolysis time per pass, if the electrolysis time is excessively short, the line speed needs to be increased accordingly, which makes control difficult. The electrolysis time per pass is therefore preferably 0.005 seconds or more and more preferably 0.01 seconds or more.

The amount of metallic Cr formed by cathodic electrolysis treatment can be controlled by the total electric quantity density, which is expressed as the product of the current density, the electrolysis time, and the number of passes. An excessively small metallic Cr amount may impair BPA-free painting corrosion resistance, and an excessively large metallic Cr amount may cause cohesive fracture in the metallic Cr layer and impair adhesion to BPA-free paint, as mentioned above. From the viewpoint of more stably ensuring adhesion to BPA-free paint and BPA-free painting corrosion resistance, it is preferable to control the total electric quantity density so that the Cr coating weight of the metallic Cr layer per one side of the steel sheet will be within an appropriate range. Here, since the relationship between the Cr coating weight of the metallic Cr layer per one side of the steel sheet and the total electric quantity density varies depending on the structure of the device used in the cathodic electrolysis treatment process, the actual electrolysis treatment conditions are adjusted depending on the device.

The type of the anode used when performing cathodic electrolysis treatment is not limited and any anode may be used. As the anode, an insoluble anode is preferably used. As the insoluble anode, at least one selected from the group consisting of an anode in which Ti is coated with one or both of a platinum group metal and an oxide of a platinum group metal and a graphite anode is preferably used. A more specific example of the insoluble anode is an anode in which the surface of Ti as a substrate is coated with platinum, iridium oxide, or ruthenium oxide.

In the cathodic electrolysis treatment process, the concentration of the electrolyte changes constantly due to the formation of the metallic Cr layer and the Cr oxide layer on the steel sheet, the introduction and removal of liquid, the evaporation of water, etc. Since the change in the concentration of the electrolyte in the cathodic electrolysis treatment process varies depending on the structure of the device and the production conditions, it is preferable to monitor the concentration of each component contained in the electrolyte and maintain it within the foregoing concentration range in the cathodic electrolysis treatment process from the viewpoint of more stably producing the surface-treated steel sheet.

The steel sheet may be optionally subjected to pretreatment before the cathodic electrolysis treatment. In the case of forming the metallic Cr layer directly on the steel sheet, it is preferable to perform at least one of degreasing, pickling, and water washing as the pretreatment.

Degreasing can remove rolling oil, rust preventive oil, etc. adhering to the steel sheet. The degreasing is not limited and may be performed by any method. After the degreasing, it is preferable to perform water washing to remove the degreasing liquid adhering to the surface of the steel sheet.

Pickling can remove a natural oxide layer present on the surface of the steel sheet and activate the surface. The pickling is not limited and may be performed by any method. After the pickling, it is preferable to perform water washing to remove the pickling liquid adhering to the surface of the steel sheet.

In the case of producing a surface-treated steel sheet including a Sn layer, a steel sheet having a Sn layer on at least one side may be optionally subjected to the pretreatment. The pretreatment method is not limited and any method may be used. As the pretreatment, it is preferable to perform one or both of electrolysis treatment in an alkaline aqueous solution and immersion treatment in an alkaline aqueous solution. As the electrolysis treatment, one or both of cathodic electrolysis treatment and anodic electrolysis treatment may be used. Preferably, the electrolysis treatment includes at least cathodic electrolysis treatment. From the viewpoint of reducing the amount of Sn oxide, the pretreatment is preferably any of the following treatments (1) to (3), more preferably treatment (1) or (2), and further preferably treatment (1):

(1) cathodic electrolysis treatment in an alkaline aqueous solution
(2) immersion treatment in an alkaline aqueous solution
(3) cathodic electrolysis treatment in an alkaline aqueous solution followed by anodic electrolysis treatment in an alkaline aqueous solution.

The alkaline aqueous solution may optionally contain one or more electrolytes. The electrolytes are not limited and any electrolytes may be used. As the electrolytes, for example, carbonate is preferably used and sodium carbonate or sodium bicarbonate is more preferably used. The concentration of the alkaline aqueous solution is not limited. The concentration of the alkaline aqueous solution is preferably 1 g/L or more. The concentration of the alkaline aqueous solution is preferably 30 g/L or less. The concentration of the alkaline aqueous solution is more preferably 5 g/L or more. The concentration of the alkaline aqueous solution is more preferably 20 g/L or less.

The temperature of the alkaline aqueous solution is not limited. The temperature of the alkaline aqueous solution is preferably 10° C. or more. The temperature of the alkaline aqueous solution is preferably 70° C. or less. The temperature of the alkaline aqueous solution is more preferably 15° C. or more. The temperature of the alkaline aqueous solution is more preferably 60° C. or less.

In the case of performing cathodic electrolysis treatment as the pretreatment, no lower limit is placed on the electric quantity density in the cathodic electrolysis treatment, but the electric quantity density in the cathodic electrolysis treatment is preferably 0.2 $C/dm^2$ or more and more preferably 0.5 $C/dm^2$ or more. No upper limit is placed on the electric quantity density in the cathodic electrolysis treatment, but an excessively high electric quantity density causes the effect of the pretreatment to be saturated, and thus the electric quantity density is preferably 10.0 $C/dm^2$ or less.

In the case of performing immersion treatment as the pretreatment, no lower limit is placed on the immersion time in the immersion treatment, but the immersion time in the immersion treatment is preferably 0.1 seconds or more and more preferably 0.5 seconds or more. No upper limit is placed on the immersion time, but an excessively long immersion time causes the effect of the pretreatment to be saturated, and thus the immersion time is preferably 10 seconds or less.

In the case of performing cathodic electrolysis treatment and thereafter anodic electrolysis treatment as the pretreatment, no lower limit is placed on the electric quantity density in the anodic electrolysis treatment, but the electric quantity density in the anodic electrolysis treatment is preferably 0.5 $C/dm^2$ or more and more preferably 1.0 $C/dm^2$ or more. No upper limit is placed on the electric quantity density in the anodic electrolysis treatment, but an excessively high electric quantity density causes the effect of the pretreatment to be saturated, and thus the electric quantity density is preferably 10.0 $C/dm^2$ or less.

After the pretreatment, it is preferable to perform water washing to remove the pretreatment liquid adhering to the surface of the steel sheet.

In the case of forming a Sn layer or a Ni-containing layer on the surface of a base steel sheet, the base steel sheet is preferably subjected to pretreatment. The pretreatment may be any treatment, but it is preferable to perform at least one of degreasing, pickling, and water washing.

In the case of producing a surface-treated steel sheet including a Ni-containing layer, a steel sheet having a Ni-containing layer on at least one side may be optionally subjected to the pretreatment. The pretreatment method is not limited and any method may be used. As the pretreatment, it is preferable to perform at least one of degreasing, pickling, and water washing.

[Immersion Process]

Next, the steel sheet obtained in the cathodic electrolysis treatment process is immersed in the electrolyte electrolessly (immersion process). That is, the steel sheet is immersed in the electrolyte without electrolysis. As a result of the immersion process, the contact angle of ethylene glycol of the surface-treated steel sheet can be adjusted to 50° or less. The electrolyte used in the immersion process may be the same as or different from the electrolyte used in the cathodic electrolysis treatment process, as long as it is the electrolyte prepared through the electrolyte preparation process. From the viewpoint of cost, the electrolyte used in the immersion process is preferably the same as the electrolyte used in the cathodic electrolysis treatment process.

Immersion time: 1.0 second to 5.0 seconds

It is important that the immersion time in the immersion treatment is 1.0 second to 5.0 seconds. If the immersion time is less than 1.0 second or more than 5.0 seconds, the contact angle of ethylene glycol exceeds 50°, and adhesion to BPA-free paint and BPA-free painting corrosion resistance degrade. From the viewpoint of further reducing the contact angle of ethylene glycol, the immersion time is preferably 1.2 seconds or more and more preferably 1.5 seconds or more. From the same viewpoint, the immersion time is preferably 4.5 seconds or less and more preferably 4.0 seconds or less.

The immersion treatment may be performed in one immersion tank or in two or more immersion tanks. For example, in the case of continuously treating the steel sheet while passing the steel sheet at a constant speed, the immersion tank needs to be long in order to ensure the immersion time. Hence, the immersion time may be ensured by continuously passing the steel sheet through two or more immersion tanks. Here, if the steel sheet dries before the next water washing process, the contact angle of ethylene glycol increases. It is therefore preferable not to dry the steel sheet during the immersion treatment. In order to prevent the steel sheet from drying, it is preferable to, when the steel sheet comes out of the immersion tank, leave the surface of the steel sheet wet with the electrolyte without removing the electrolyte on the surface of the steel sheet by wringer rolls or the like. It is also preferable to shorten the time from when the steel sheet leaves one immersion tank to when the steel sheet enters the next immersion tank as much as possible. From the viewpoint of preventing drying and reducing equipment costs, the immersion treatment is preferably performed in one immersion tank. The immersion treatment may be performed in the electrolysis tank in which the cathodic electrolysis treatment was performed.

The temperature of the electrolyte during the immersion treatment is not limited, but is preferably in the temperature range of 40° C. or more and 70° C. or less from the viewpoint of further reducing the contact angle of ethylene glycol of the surface-treated steel sheet. From the viewpoint of stably producing the surface-treated steel sheet, it is preferable to monitor the temperature of the electrolyte and maintain the temperature within the foregoing temperature range in the immersion process.

The pH of the electrolyte during the immersion treatment is not limited, but is preferably 4.0 or more and more preferably 4.5 or more. The pH is preferably 7.0 or less and more preferably 6.5 or less. From the viewpoint of stably producing the above-described surface-treated steel sheet, it is preferable to monitor the pH of the electrolyte and maintain the pH within the foregoing pH range in the immersion process.

In the immersion process, the concentration of the electrolyte changes constantly due to the introduction and removal of liquid, the evaporation of water, etc. Since the change in the concentration of the electrolyte in the immersion process varies depending on the structure of the device and the production conditions, it is preferable to monitor the concentration of each component contained in the electrolyte and maintain it within the foregoing concentration range in the immersion process from the viewpoint of more stably producing the surface-treated steel sheet.

It is preferable to prevent the steel sheet from drying during the time from the cathodic electrolysis treatment process to the immersion process, from the viewpoint of adjusting the contact angle of ethylene glycol to 50° or less. In the case where different tanks or electrolytes of different compositions are used in the cathodic electrolysis treatment process and the immersion process, water washing may be optionally performed between the cathodic electrolysis treatment process and the immersion process.

[Water Washing Process]

Next, the steel sheet after the immersion process is washed with water at least once. As a result of water washing, the electrolyte remaining on the surface of the steel sheet can be removed. The water washing is not limited and may be performed by any method. For example, a water washing tank may be provided downstream of the immersion tank for performing the immersion process so that the steel sheet after immersion can be continuously immersed in water. Water washing may be performed by spraying water on the steel sheet after immersion.

The number of times water washing is performed is not limited and may be one or two or more. In order to avoid requiring an excessive number of water washing tanks, the number of times water washing is performed is preferably 5 or less. In the case of performing water washing treatment twice or more, these water washing treatments may be performed by the same method or different methods.

In the present disclosure, it is important to use water having an electrical conductivity of 100 μS/m or less in at least the last water wash in the water washing process. This reduces the amount of K, Na, Mg, and Ca adsorbed on the surface of the surface-treated steel sheet, with it being possible to improve adhesion to BPA-free paint. Water having an electrical conductivity of 100 μS/m or less can be produced by any method. Examples of the water having an electrical conductivity of 100 μS/m or less include ion-exchanged water and distilled water. Although no lower limit is placed on the electrical conductivity, excessively reducing the electrical conductivity leads to an increase in production costs. Hence, from the viewpoint of production costs, the electrical conductivity is preferably 1 μS/m or more, more preferably 5 μS/m or more, and further preferably 10 μS/m or more.

In the case of performing water washing twice or more in the water washing process, any water may be used for each water wash other than the last water wash because the foregoing effect can be achieved as long as water having an electrical conductivity of 100 μS/m or less is used for the last water wash. Although water having an electrical conductivity of 100 μS/m or less may be used for each water wash other than the last water wash, from the viewpoint of reducing costs, it is preferable to use water having an electrical conductivity of 100 μS/m or less only for the last water wash and use normal water such as tap water or industrial water for each water wash other than the last water wash.

From the viewpoint of further reducing the amount of K, Na, Mg, and Ca adsorbed on the surface of the surface-treated steel sheet, the electrical conductivity of the water used for the last water wash is preferably 50 μS/m or less and more preferably 30 μS/m or less.

The temperature of the water used in the water washing treatment is not limited and may be any temperature. Since an excessively high temperature puts an excessive load on the water washing equipment, the temperature of the water used in the water washing is preferably 95° C. or less. No lower limit is placed on the temperature of the water used in the water washing, but the temperature is preferably 0° C. or more. The temperature of the water used in the water washing may be room temperature.

The water washing time per water washing treatment is not limited, but is preferably 0.1 seconds or more and more preferably 0.2 seconds or more from the viewpoint of enhancing the effect of water washing treatment. No upper limit is placed on the water washing time per water washing treatment, but the water washing time is preferably 10 seconds or less and more preferably 8 seconds or less because, in the case of production in a continuous line, the line speed decreases and productivity decreases.

After the water washing process, drying may be optionally performed. The drying method is not limited, and a typical dryer or electric furnace drying method may be used. The temperature during the drying treatment is preferably 100° C. or less. If the temperature is within this range, the deterioration of the surface-coating layer can be suppressed. Although no lower limit is placed on the temperature during the drying treatment, the temperature is typically about room temperature.

The use of the surface-treated steel sheet according to the present disclosure is not limited. For example, the surface-treated steel sheet is suitable as a surface-treated steel sheet for containers used in the production of various containers such as food cans, beverage cans, pails, and 18-liter cans.

EXAMPLES

Example 1

In order to determine the effects according to the present disclosure, surface-treated steel sheets were produced by the procedure described below and their properties were evaluated. In Example 1, surface-treated steel sheets each comprising: a steel sheet; a metallic Cr layer disposed on at least one surface of the steel sheet; and a Cr oxide layer disposed on the metallic Cr layer were produced.

(Electrolytic Solution Preparation Process)

First, electrolytes having compositions A to G shown in Table 1 were prepared under the conditions shown in Table 1. In detail, the components shown in Table 1 were mixed with water to prepare an aqueous solution, and the aqueous solution was then adjusted to the pH and temperature shown in Table 1. Electrolyte G corresponds to the electrolyte used in the examples in PTL 6. Ammonia water was used to increase the pH for each electrolyte. Sulfuric acid was used to decrease the pH for electrolytes A, B, and G. Hydrochloric acid was used to decrease the pH for electrolytes C and D. Nitric acid was used to decrease the pH for electrolytes E and F.

(Pretreatment of Steel Sheet)

Steel sheets were subjected to electrolytic degreasing, water washing, pickling by immersion in dilute sulfuric acid, and water washing in sequence, and then subjected to a cathodic electrolysis treatment process while being kept wet. As each of the steel sheets, a steel sheet for cans (T4 blank sheet) having the Cr content shown in Tables 2 and 3 and a sheet thickness of 0.17 mm was used.

(Cathodic Electrolysis Treatment Process)

The steel sheet was then subjected to cathodic electrolysis treatment under the conditions shown in Tables 2 and 3. The electrolyte during the cathodic electrolysis treatment was maintained at the pH and temperature shown in Table 1. During the cathodic electrolysis treatment, the current density was 40 A/dm$^2$, and the electrolysis time and the number of passes were varied as appropriate. As the anode in the cathodic electrolysis treatment, an insoluble anode composed of a Ti substrate coated with iridium oxide was used. After the cathodic electrolysis treatment, the steel sheet was subjected to an immersion process while being kept wet so as not to dry.

(Immersion Process)

The steel sheet after the cathodic electrolysis treatment was then immersed in the electrolyte. The immersion time was as shown in Tables 2 and 3. The electrolyte during the immersion was maintained at the pH and temperature shown in Table 1. In the case where the same electrolyte was used in the cathodic electrolysis treatment process and the immersion process, the steel sheet was subjected to the immersion process while being kept wet so as not to dry, without washing the steel sheet with water and without squeezing out the electrolyte with wringer rolls or the like. In the case where different electrolytes were used in the cathodic electrolysis treatment process and the immersion process, the steel sheet was washed with water after the cathodic electrolysis treatment process so as not to bring the electrolyte used in the cathodic electrolysis treatment process into the electrolyte tank in the immersion process, and subjected to the immersion process while being kept wet so as not to dry. After the immersion process, the steel sheet was subjected to a water washing process while being kept wet so as not to dry.

(Water Washing Process)

The steel sheet after the immersion process was then subjected to water washing treatment. The water washing treatment was performed one to five times under the conditions shown in Tables 2 and 3. The water washing method and the electrical conductivity of the water used in each water washing treatment were as shown in Tables 2 and 3. After the water washing, the steel sheet was dried at room temperature using a blower.

For each of the obtained surface-treated steel sheets, the Cr coating weight of the metallic Cr layer per one side of the steel sheet and the Cr coating weight of the Cr oxide layer per one side of the steel sheet were measured by the above-described methods. Moreover, for each of the obtained surface-treated steel sheets, the contact angle of ethylene glycol, the amount of adsorbed elements, the Fe atomic ratio, the Sn atomic ratio, and the Ni atomic ratio were measured by the below-described methods. The measurement results are shown in Tables 4 and 5.

(Contact Angle of Ethylene Glycol)

The contact angle of ethylene glycol of the obtained surface-treated steel sheet was measured using an automatic contact angle meter CA-VP model produced by Kyowa Interface Science Co., Ltd. The surface temperature of the surface-treated steel sheet was set to 20° C.±1° C. As the ethylene glycol, special grade chemical ethylene glycol produced by Fujifilm Wako Pure Chemical Corporation at 20° C.±1° C. was used. 2 μl of the ethylene glycol was dropped onto the surface of the surface-treated steel sheet and, after 1 second, the contact angle was measured by the θ/2 method. The arithmetic mean value of the contact angles for 5 droplets was taken to be the contact angle of ethylene glycol.

In order to determine the change in contact angle due to heat, the contact angle after the surface-treated steel sheet was heat-treated at 200° C. for 10 minutes was also measured. The measurement conditions were the same as above. As a result, in each surface-treated steel sheet satisfying the conditions according to the present disclosure, the contact angle was substantially the same between before and after the heat treatment. In some surface-treated steel sheets not satisfying the conditions according to the present disclosure, on the other hand, the contact angle changed significantly due to the heat treatment.

(Amount of Adsorbed Elements)

The total atomic ratio of K, Na, Mg, and Ca adsorbed on the surface of the surface-treated steel sheet to Cr was measured by XPS. No sputtering was performed in the measurement. From the integrated intensities of the narrow spectra of K2p, Na1s, Ca2p, Mg1s, and Cr2p on the outermost surface of the sample, the atomic ratios were quantified by the relative sensibility coefficient method, and (the K atomic ratio+the Na atomic ratio+the Ca atomic ratio+the Mg atomic ratio)/(the Cr atomic ratio) was calculated. For the XPS measurement, a scanning X-ray photoelectron spectrometer PHI X-tool produced by ULVAC-PHI, Inc. was used. The X-ray source was a monochromatic AlKα ray, the voltage was 15 kV, the beam diameter was 100 μmφ, and the extraction angle was 45°.

(Fe Atomic Ratio)

The atomic ratio of Fe to Cr on the surface of the surface-treated steel sheet was measured by XPS. No sputtering was performed in the measurement. From the integrated intensities of the narrow spectra of Fe2p and Cr2p on the surface of the sample, the atomic ratios were quantified by the relative sensibility coefficient method, and (the Fe atomic ratio)/(the Cr atomic ratio) was calculated. For the XPS measurement, a scanning X-ray photoelectron spectrometer PHI X-tool produced by ULVAC-PHI, Inc. was used. The X-ray source was a monochromatic AlKα ray, the voltage was 15 kV, the beam diameter was 100 μmφ, and the extraction angle was 45°.

Furthermore, for each of the obtained surface-treated steel sheets, adhesion to BPA-free paint and BPA-free painting corrosion resistance were evaluated by the below-described methods. The evaluation results are shown in Tables 4 and 5.

(Preparation of Samples)

As samples used for the evaluation of adhesion to BPA-free paint and BPA-free painting corrosion resistance, BPA-free prepainted steel sheets were prepared by the following procedure.

Polyester-based paint for the inner surface of a can (BPA-free paint) was applied to the surface of the obtained surface-treated steel sheet, and baked at 180° C. for 10 minutes to produce a BPA-free prepainted steel sheet. The coating weight of the paint was 60 mg/dm$^2$.

(Adhesion to BPA-Free Paint)

Two BPA-free prepainted steel sheets produced under the same conditions were stacked with a nylon adhesive film therebetween so that their painted surfaces would face each other, and then bonded together under pressure bonding conditions of pressure: $2.94\times10^5$ Pa, temperature: 190° C., and pressure bonding time: 30 seconds. The bonded steel sheets were then divided into test pieces of 5 mm in width. The test pieces were immersed in a 55° C. test liquid made of a mixed aqueous solution containing 1.5 mass % citric acid and 1.5 mass % salt for 168 hours. After the immersion, the test pieces were cleaned and dried. The two steel sheets of each test piece were then peeled away from each other, and the tensile strength when the two steel sheets were peeled away from each other was measured. The average value of three test pieces was evaluated into the following four levels. Practically, levels 1 to 3 indicate excellent adhesion to BPA-free paint.

1:2.5 kgf or more

2:2.0 kgf or more and less than 2.5 kgf

3:1.5 kgf or more and less than 2.0 kgf

4: less than 1.5 kgf (BPA-Free Painting Corrosion Resistance)

The painted surface of the produced BPA-free prepainted steel sheet was cross-cut to a depth reaching the steel substrate (steel sheet), using a cutter. The BPA-free prepainted steel sheet that had been cross-cut was immersed in a 55° C. test liquid made of a mixed aqueous solution containing 1.5 mass % citric acid and 1.5 mass % salt for 96 hours. After the immersion, the BPA-free prepainted steel sheet was cleaned and dried. Cellophane adhesive tape was then attached to the painted surface of the BPA-free prepainted steel sheet, and the tape was peeled away. At any four sites of the cross-cut part of the BPA-free prepainted steel sheet, the coating peeling width (the total width from the cut to the left and right) was measured. The average value for the four sites was then calculated and taken to be the corrosion width. The BPA-free painting corrosion resistance was evaluated into the following four levels based on the corrosion width. Practically, levels 1 to 3 indicate excellent BPA-free painting corrosion resistance.

1: corrosion width of less than 0.3 mm

2: corrosion width of 0.3 mm or more and less than 0.5 mm

3: corrosion width of 0.5 mm or more and less than 1.0 mm

4: corrosion width of 1.0 mm or more

[Table 1]

TABLE 1

| | Electrolyte | A | B | C | D | E | F | G |
|---|---|---|---|---|---|---|---|---|
| Components (mol/L) | $Cr(OH)SO_4 \bullet Na_2SO_4$ | — | — | — | — | — | — | 0.39 |
| | $Cr_2(SO_4)_3$ | 0.1 | 0.2 | — | — | — | — | — |
| | $CrCl_3$ | — | — | 0.2 | 0.5 | — | — | — |
| | $Cr(NO_3)_3$ | — | — | — | — | 0.2 | 0.5 | — |
| | $HCO_2H$ | 4.2 | — | 0.4 | — | 4.8 | — | — |
| | $NH_4CHO_2$ | — | 0.5 | — | 3.5 | — | 0.5 | — |
| | $HCO_2K$ | — | — | — | — | — | — | 0.61 |
| | $NH_4Cl$ | 1.1 | 1.4 | 0.7 | — | 1.5 | — | — |
| | $NH_4Br$ | — | 0.3 | 0.6 | 0.4 | 0.2 | 1.3 | — |
| | KCl | — | — | — | — | — | — | 3.35 |
| | KBr | — | — | — | — | — | — | 0.13 |
| | pH | 5.0 | 5.7 | 5.1 | 4.3 | 6.8 | 5.8 | 2.3 |
| | Temperature (° C.) | 42 | 50 | 65 | 55 | 55 | 53 | 50 |
| | Remarks | Example | Example | Example | Example | Example | Example | Comparative Example |

[Table 2]

TABLE 2

| No. | Production conditions | | | | | | | | |
|---|---|---|---|---|---|---|---|---|---|
| | Steel sheet Cr content [%] | Cathodic electrolysis treatment: Electrolyte | Cathodic electrolysis treatment: Electric quantity density [C/dm$^2$] | Immersion treatment: Electrolyte | Immersion treatment: Immersion time [sec] | Water washing treatment, First time: Method | Water washing treatment, First time: Conductivity [μS/m] | Water washing treatment, Second time: Method | Water washing treatment, Second time: Conductivity [μS/m] |
| F1 | 0.04 | A | 160 | A | 1.65 | Immersion | 24 | — | — |
| F2 | 0.04 | B | 80 | B | 2.34 | Spray | 12 | — | — |
| F3 | 0.04 | C | 60 | C | 1.89 | Spray | 8 | Immersion | 11 |
| F4 | 0.04 | D | 120 | D | 3.50 | Spray | 7 | Spray | 8 |
| F5 | 0.04 | E | 240 | E | 3.64 | Spray | 15 | Immersion | 23 |

TABLE 2-continued

| | | | | | | | | | |
|---|---|---|---|---|---|---|---|---|---|
| F6 | 0.04 | F | 160 | F | 2.81 | Immersion | 16 | Immersion | 18 |
| F7 | 0.04 | A | 400 | A | 2.87 | Spray | 11 | Immersion | 12 |
| F8 | 0.04 | B | 60 | B | 3.10 | Immersion | 13 | Immersion | 28 |
| F9 | 0.04 | C | 240 | C | 3.95 | Immersion | 8 | Immersion | 13 |
| F10 | 0.04 | D | 400 | D | 1.53 | Immersion | 22 | Spray | 12 |
| F11 | 0.04 | E | 160 | E | 2.46 | Immersion | 203 | Immersion | 63 |
| F12 | 0.04 | F | 180 | F | 2.51 | Immersion | 13 | Spray | 154 |
| F13 | 0.04 | A | 60 | A | 2.81 | Immersion | 49 | Immersion | 38 |
| F14 | 0.04 | B | 120 | B | 3.60 | Immersion | 33 | Spray | 103 |
| F15 | 0.04 | C | 360 | C | 2.45 | Immersion | 82 | Immersion | 94 |
| F16 | 0.04 | D | 40 | D | 2.53 | Immersion | 154 | Spray | 48 |
| F17 | 0.04 | E | 120 | E | 2.71 | Immersion | 46 | — | — |
| F18 | 0.04 | F | 450 | F | 2.94 | Spray | 38 | — | — |
| F19 | 0.04 | A | 120 | A | 3.74 | Immersion | 92 | — | — |
| F20 | 0.04 | B | 170 | B | 3.54 | Spray | 68 | — | — |
| F21 | 0.04 | C | 120 | C | 1.93 | Immersion | 117 | — | — |
| F22 | 0.04 | D | 160 | D | 1.79 | Spray | 216 | — | — |
| F23 | 0.04 | E | 180 | E | 3.25 | Immersion | 12 | Immersion | 34 |
| F24 | 0.04 | F | 300 | F | 1.79 | Immersion | 9 | Spray | 42 |
| F25 | 0.04 | A | 360 | A | 2.89 | Immersion | 22 | Immersion | 58 |
| F26 | 0.04 | B | 160 | B | 3.55 | Immersion | 18 | Spray | 67 |
| F27 | 0.04 | C | 100 | C | 3.03 | Immersion | 11 | Immersion | 109 |
| F28 | 0.04 | D | 180 | D | 2.84 | Immersion | 17 | Spray | 184 |
| F29 | 0.04 | E | 120 | E | 1.90 | Immersion | 26 | Immersion | 13 |
| F30 | 0.04 | F | 160 | F | 2.07 | Spray | 13 | Immersion | 12 |
| F31 | 0.04 | A | 60 | A | 2.74 | Immersion | 11 | Spray | 8 |
| F32 | 0.04 | B | 100 | B | 3.25 | Immersion | 12 | Immersion | 10 |
| F33 | 0.04 | C | 120 | C | 4.43 | Immersion | 14 | Spray | 19 |
| F34 | 0.04 | D | 340 | D | 3.20 | Immersion | 24 | Immersion | 20 |
| F35 | 0.04 | E | 100 | E | 3.12 | Immersion | 19 | Immersion | 21 |
| F36 | 0.04 | F | 120 | F | 1.57 | Immersion | 11 | Spray | 16 |
| F37 | 0.04 | A | 180 | A | 1.80 | Immersion | 21 | Immersion | 13 |

| | Production conditions Water washing treatment | | | | | | |
|---|---|---|---|---|---|---|---|
| | Third time | | Fourth time | | Fifth time | | |
| No. | Method | Conductivity [μS/m] | Method | Conductivity [μS/m] | Method | Conductivity [μS/m] | Remarks |
| F1 | — | — | — | — | — | — | Example |
| F2 | — | — | — | — | — | — | Example |
| F3 | — | — | — | — | — | — | Example |
| F4 | — | — | — | — | — | — | Example |
| F5 | Immersion | 25 | — | — | — | — | Example |
| F6 | Spray | 17 | — | — | — | — | Example |
| F7 | Immersion | 9 | Immersion | 13 | — | — | Example |
| F8 | Spray | 16 | Spray | 19 | — | — | Example |
| F9 | Immersion | 23 | Immersion | 16 | Immersion | 22 | Example |
| F10 | Spray | 24 | Immersion | 8 | Spray | 12 | Example |
| F11 | Spray | 26 | — | — | — | — | Example |
| F12 | Spray | 9 | — | — | — | — | Example |
| F13 | Spray | 11 | — | — | — | — | Example |
| F14 | Spray | 4 | — | — | — | — | Example |
| F15 | Spray | 19 | — | — | — | — | Example |
| F16 | Spray | 23 | — | — | — | — | Example |
| F17 | — | — | — | — | — | — | Example |
| F18 | — | — | — | — | — | — | Example |
| F19 | — | — | — | — | — | — | Example |
| F20 | — | — | — | — | — | — | Example |
| F21 | — | — | — | — | — | — | Comparative Example |
| F22 | — | — | — | — | — | — | Comparative Example |
| F23 | — | — | — | — | — | — | Example |
| F24 | — | — | — | — | — | — | Example |
| F25 | — | — | — | — | — | — | Example |
| F26 | — | — | — | — | — | — | Example |
| F27 | — | — | — | — | — | — | Comparative Example |
| F28 | — | — | — | — | — | — | Comparative Example |
| F29 | Immersion | 39 | — | — | — | — | Example |
| F30 | Spray | 33 | — | — | — | — | Example |
| F31 | Immersion | 61 | — | — | — | — | Example |
| F32 | Spray | 71 | — | — | — | — | Example |
| F33 | Immersion | 104 | — | — | — | — | Comparative Example |

TABLE 2-continued

| No. | Method | Conductivity | Method | Conductivity | Method | Conductivity | Remarks |
|---|---|---|---|---|---|---|---|
| F34 | Spray | 159 | — | — | — | — | Comparative Example |
| F35 | Spray | 13 | Immersion | 49 | — | — | Example |
| F36 | Immersion | 15 | Spray | 43 | — | — | Example |
| F37 | Spray | 12 | Immersion | 56 | — | — | Example |

[Table 3]

TABLE 3

| | Production conditions | | | | | | | | | | |
|---|---|---|---|---|---|---|---|---|---|---|---|
| | Steel sheet Cr content | Cathodic electrolysis treatment | | Immersion treatment | | Water washing treatment | | | |
| | | | | | | First time | | Second time | |
| No. | [%] | Electrolyte | Electric quantity density [C/dm$^2$] | Electrolyte | Immersion time [sec] | Method | Conductivity [μS/m] | Method | Conductivity [μS/m] |
| F38 | 0.04 | B | 200 | B | 2.32 | Spray | 26 | Immersion | 11 |
| F39 | 0.04 | C | 200 | C | 3.56 | Immersion | 27 | Immersion | 15 |
| F40 | 0.04 | D | 120 | D | 2.87 | Spray | 10 | Immersion | 18 |
| F41 | 0.04 | E | 100 | E | 3.62 | Immersion | 16 | Spray | 23 |
| F42 | 0.04 | F | 120 | F | 2.94 | Immersion | 14 | Spray | 22 |
| F43 | 0.04 | A | 80 | A | 1.97 | Immersion | 18 | Immersion | 20 |
| F44 | 0.04 | B | 40 | B | 3.46 | Immersion | 19 | Immersion | 17 |
| F45 | 0.04 | C | 240 | C | 3.50 | Immersion | 23 | Immersion | 16 |
| F46 | 0.04 | D | 300 | D | 2.98 | Immersion | 22 | Immersion | 15 |
| F47 | 0.04 | E | 280 | E | 1.67 | No water washing | — | — | — |
| F48 | 0.04 | G | 300 | G | 2.12 | Immersion | 23 | Immersion | 21 |
| F49 | 0.04 | G | 240 | G | 3.39 | Immersion | 21 | Spray | 23 |
| F50 | 0.04 | A | 40 | A | 2.19 | Immersion | 12 | Spray | 21 |
| F51 | 0.04 | B | 30 | B | 3.59 | Spray | 16 | Spray | 16 |
| F52 | 0.04 | C | 480 | C | 2.35 | Spray | 13 | Spray | 11 |
| F53 | 0.04 | D | 500 | D | 2.37 | Spray | 28 | Spray | 8 |
| F54 | 0.04 | D | 100 | D | 1.38 | Spray | 15 | Spray | 12 |
| F55 | 0.04 | E | 280 | E | 1.15 | Spray | 11 | Spray | 14 |
| F56 | 0.04 | F | 180 | F | 0.75 | Spray | 22 | Spray | 15 |
| F57 | 0.04 | A | 160 | A | 4.34 | Spray | 23 | Spray | 16 |
| F58 | 0.04 | B | 200 | B | 4.80 | Spray | 9 | Spray | 10 |
| F59 | 0.04 | C | 100 | C | 5.25 | Spray | 15 | Spray | 13 |
| F60 | 0.04 | A | 60 | B | 3.98 | Spray | 8 | Spray | 17 |
| F61 | 0.04 | B | 120 | D | 2.42 | Spray | 16 | Spray | 28 |
| F62 | 0.04 | C | 340 | F | 3.83 | Spray | 19 | Spray | 26 |
| F63 | 0.04 | D | 440 | E | 2.85 | Spray | 22 | Spray | 22 |
| F64 | 0.04 | E | 300 | A | 2.13 | Spray | 20 | Spray | 24 |
| F65 | 0.04 | F | 80 | C | 1.78 | Spray | 16 | Spray | 21 |
| F66 | 0.04 | B | 160 | G | 2.67 | Spray | 13 | Spray | 16 |
| F67 | 0.04 | C | 240 | G | 2.45 | Spray | 7 | Spray | 17 |
| F68 | 0.04 | E | 160 | G | 2.91 | Spray | 24 | Spray | 8 |
| F69 | 0.04 | G | 240 | A | 3.43 | Spray | 12 | Spray | 12 |
| F70 | 0.04 | G | 200 | D | 2.67 | Spray | 23 | Spray | 26 |
| F71 | 0.04 | G | 60 | F | 3.01 | Spray | 11 | Spray | 21 |
| F72 | 0.09 | E | 100 | E | 2.59 | Spray | 15 | Spray | 20 |
| F73 | 0.12 | F | 160 | F | 3.09 | Spray | 9 | Spray | 10 |

| | Production conditions Water washing treatment | | | | | | |
|---|---|---|---|---|---|---|---|
| | Third time | | Fourth time | | Fifth time | | |
| No. | Method | Conductivity [μS/m] | Method | Conductivity [μS/m] | Method | Conductivity [μS/m] | Remarks |
| F38 | Spray | 9 | Spray | 66 | — | — | Example |
| F39 | Spray | 10 | Immersion | 147 | — | — | Comparative Example |
| F40 | Spray | 23 | Spray | 204 | — | — | Comparative Example |
| F41 | Spray | 11 | Immersion | 24 | Immersion | 41 | Example |
| F42 | Immersion | 18 | Immersion | 20 | Spray | 31 | Example |
| F43 | Spray | 15 | Immersion | 13 | Immersion | 67 | Example |
| F44 | Spray | 23 | Immersion | 21 | Spray | 82 | Example |

TABLE 3-continued

| | | | | | | | |
|---|---|---|---|---|---|---|---|
| F45 | Spray | 11 | Immersion | 15 | Immersion | 163 | Comparative Example |
| F46 | Spray | 19 | Immersion | 13 | Spray | 118 | Comparative Example |
| F47 | — | — | — | — | — | — | Comparative Example |
| F48 | Spray | 13 | — | — | — | — | Comparative Example |
| F49 | Immersion | 12 | — | — | — | — | Comparative Example |
| F50 | — | — | — | — | — | — | Example |
| F51 | — | — | — | — | — | — | Example |
| F52 | — | — | — | — | — | — | Example |
| F53 | — | — | — | — | — | — | Example |
| F54 | — | — | — | — | — | — | Example |
| F55 | — | — | — | — | — | — | Example |
| F56 | — | — | — | — | — | — | Comparative Example |
| F57 | — | — | — | — | — | — | Example |
| F58 | — | — | — | — | — | — | Example |
| F59 | — | — | — | — | — | — | Comparative Example |
| F60 | — | — | — | — | — | — | Example |
| F61 | — | — | — | — | — | — | Example |
| F62 | — | — | — | — | — | — | Example |
| F63 | — | — | — | — | — | — | Example |
| F64 | — | — | — | — | — | — | Example |
| F65 | — | — | — | — | — | — | Example |
| F66 | — | — | — | — | — | — | Comparative Example |
| F67 | — | — | — | — | — | — | Comparative Example |
| F68 | — | — | — | — | — | — | Comparative Example |
| F69 | — | — | — | — | — | — | Comparative Example |
| F70 | — | — | — | — | — | — | Comparative Example |
| F71 | — | — | — | — | — | — | Comparative Example |
| F72 | — | — | — | — | — | — | Example |
| F73 | — | — | — | — | — | — | Example |

[Table 4]

TABLE 4

| | Measurement results | | | | | Evaluation | | |
|---|---|---|---|---|---|---|---|---|
| No. | Metallic Cr layer Cr coating weight [mg/m$^2$] | Cr oxide layer Cr coating weight [mg/m$^2$] | Contact angle of ethylene glycol [°] | Atomic ratio of adsorbed elements [%] | Fe atomic ratio [%] | Adhesion to BPA-free paint | BPA-free painting corrosion resistance | Remarks |
| F1 | 203.5 | 2.6 | 41.3 | 0.0 | 1.6 | 1 | 1 | Example |
| F2 | 102.3 | 4.8 | 25.6 | 0.0 | 2.3 | 1 | 1 | Example |
| F3 | 82.3 | 9.6 | 16.3 | 0.0 | 3.2 | 1 | 1 | Example |
| F4 | 156.3 | 13.2 | 12.1 | 0.0 | 4.3 | 1 | 1 | Example |
| F5 | 302.4 | 11.4 | 24.3 | 0.0 | 0.0 | 1 | 1 | Example |
| F6 | 188.2 | 1.3 | 40.5 | 0.0 | 2.6 | 1 | 1 | Example |
| F7 | 409.2 | 0.2 | 30.8 | 0.6 | 2.8 | 1 | 1 | Example |
| F8 | 67.3 | 13.5 | 21.2 | 0.2 | 8.3 | 1 | 1 | Example |
| F9 | 266.5 | 0.1 | 22.5 | 0.0 | 2.6 | 1 | 1 | Example |
| F10 | 387.3 | 10.1 | 20.3 | 0.5 | 1.2 | 1 | 1 | Example |
| F11 | 171.2 | 3.5 | 13.8 | 0.0 | 1.3 | 1 | 1 | Example |
| F12 | 221.3 | 1.8 | 30.4 | 0.0 | 0.0 | 1 | 1 | Example |
| F13 | 58.3 | 6.5 | 41.2 | 0.7 | 7.3 | 1 | 1 | Example |
| F14 | 121.3 | 7.4 | 16.8 | 0.0 | 2.9 | 1 | 1 | Example |
| F15 | 351.6 | 3.5 | 17.5 | 0.8 | 6.2 | 1 | 1 | Example |
| F16 | 48.6 | 3.9 | 24.9 | 0.0 | 5.1 | 1 | 1 | Example |
| F17 | 135.5 | 2.1 | 21.8 | 1.3 | 0.0 | 2 | 2 | Example |
| F18 | 441.3 | 1.5 | 31.0 | 2.6 | 2.3 | 2 | 2 | Example |
| F19 | 135.0 | 0.4 | 44.2 | 4.2 | 0.8 | 3 | 3 | Example |
| F20 | 170.8 | 0.6 | 12.3 | 3.9 | 1.8 | 3 | 3 | Example |
| F21 | 122.5 | 1.8 | 34.2 | 5.1 | 2.0 | 4 | 4 | Comparative Example |

TABLE 4-continued

| | Measurement results | | | | | Evaluation | | |
|---|---|---|---|---|---|---|---|---|
| No. | Metallic Cr layer Cr coating weight [mg/m$^2$] | Cr oxide layer Cr coating weight [mg/m$^2$] | Contact angle of ethylene glycol [°] | Atomic ratio of adsorbed elements [%] | Fe atomic ratio [%] | Adhesion to BPA-free paint | BPA-free painting corrosion resistance | Remarks |
| F22 | 165.3 | 2.5 | 40.1 | 7.3 | 0.0 | 4 | 4 | Comparative Example |
| F23 | 174.8 | 5.8 | 13.9 | 2.1 | 2.4 | 2 | 2 | Example |
| F24 | 304.6 | 7.2 | 24.9 | 1.1 | 0.9 | 2 | 2 | Example |
| F25 | 374.9 | 1.6 | 28.1 | 3.3 | 1.9 | 3 | 3 | Example |
| F26 | 153.7 | 0.3 | 15.5 | 3.6 | 5.6 | 3 | 3 | Example |
| F27 | 93.8 | 2.9 | 18.4 | 6.3 | 7.4 | 4 | 4 | Comparative Example |
| F28 | 189.9 | 6.7 | 28.1 | 5.7 | 1.2 | 4 | 4 | Comparative Example |
| F29 | 132.6 | 3.4 | 32.9 | 2.8 | 3.8 | 2 | 2 | Example |
| F30 | 162.6 | 8.4 | 16.3 | 1.6 | 1.2 | 2 | 2 | Example |
| F31 | 62.3 | 12.6 | 26.5 | 3.2 | 1.8 | 3 | 3 | Example |
| F32 | 91.9 | 14.5 | 23.4 | 4.9 | 5.6 | 3 | 3 | Example |
| F33 | 134.0 | 12.3 | 22.1 | 8.3 | 9.7 | 4 | 4 | Comparative Example |
| F34 | 345.2 | 11.6 | 20.3 | 5.2 | 4.6 | 4 | 4 | Comparative Example |
| F35 | 103.2 | 9.8 | 17.6 | 2.1 | 9.2 | 2 | 2 | Example |
| F36 | 122.9 | 13.2 | 19.4 | 2.3 | 7.1 | 2 | 2 | Example |
| F37 | 176.3 | 14.2 | 33.4 | 4.2 | 0.4 | 3 | 3 | Example |

[Table 5]

TABLE 5

| | Measurement results | | | | | Evaluation | | |
|---|---|---|---|---|---|---|---|---|
| No. | Metallic Cr layer Cr coating weight [mg/m$^2$] | Cr oxide layer Cr coating weight [mg/m$^2$] | Contact angle of ethylene glycol | Atomic ratio of adsorbed elements [%] | Fe atomic ratio [%] | Adhesion to BPA-free paint | BPA-free painting corrosion resistance | Remarks |
| F38 | 223.6 | 7.2 | 16.7 | 3.5 | 1.5 | 3 | 3 | Example |
| F39 | 197.0 | 5.6 | 27.7 | 5.5 | 6.5 | 4 | 4 | Comparative Example |
| F40 | 142.5 | 6.6 | 13.6 | 5.7 | 5.4 | 4 | 4 | Comparative Example |
| F41 | 101.3 | 13.5 | 22.8 | 1.7 | 1.7 | 2 | 2 | Example |
| F42 | 120.8 | 12.0 | 40.9 | 1.4 | 3.8 | 2 | 2 | Example |
| F43 | 72.5 | 8.4 | 37.0 | 4.4 | 4.4 | 3 | 3 | Example |
| F44 | 53.2 | 6.4 | 19.5 | 3.8 | 2.8 | 3 | 3 | Example |
| F45 | 224.6 | 5.5 | 24.9 | 7.3 | 3.2 | 4 | 4 | Comparative Example |
| F46 | 305.1 | 4.7 | 39.4 | 6.2 | 0.0 | 4 | 4 | Comparative Example |
| F47 | 278.3 | 6.0 | 82.3 | 8.6 | 2.6 | 4 | 4 | Comparative Example |
| F48 | 241.6 | 2.3 | 72.6 | 0.0 | 0.0 | 4 | 4 | Comparative Example |
| F49 | 189.3 | 2.2 | 66.3 | 0.0 | 2.7 | 4 | 4 | Comparative Example |
| F50 | 43.4 | 4.1 | 16.7 | 0.3 | 3.4 | 1 | 2 | Example |
| F51 | 37.2 | 3.8 | 18.4 | 0.1 | 2.8 | 1 | 3 | Example |
| F52 | 472.6 | 3.3 | 22.5 | 0.0 | 3.7 | 2 | 2 | Example |
| F53 | 523.1 | 12.5 | 26.8 | 0.0 | 9.4 | 3 | 3 | Example |
| F54 | 100.1 | 11.0 | 47.3 | 0.0 | 4.6 | 2 | 2 | Example |
| F55 | 265.6 | 13.2 | 49.1 | 0.3 | 6.1 | 3 | 3 | Example |
| F56 | 187.3 | 2.5 | 52.8 | 0.0 | 5.1 | 4 | 4 | Comparative Example |
| F57 | 154.2 | 2.3 | 45.4 | 0.0 | 1.1 | 2 | 2 | Example |
| F58 | 229.5 | 3.8 | 48.6 | 0.2 | 0.0 | 3 | 3 | Example |
| F59 | 136.3 | 4.9 | 51.6 | 0.0 | 2.6 | 4 | 4 | Comparative Example |
| F60 | 72.3 | 11.2 | 31.8 | 0.4 | 3.2 | 1 | 1 | Example |
| F61 | 129.6 | 13.8 | 38.5 | 0.0 | 1.5 | 1 | 1 | Example |
| F62 | 332.1 | 11.2 | 22.1 | 0.0 | 0.0 | 1 | 1 | Example |

TABLE 5-continued

| No. | Measurement results: Metallic Cr layer Cr coating weight [mg/m²] | Cr oxide layer Cr coating weight [mg/m²] | Contact angle of ethylene glycol | Atomic ratio of adsorbed elements [%] | Fe atomic ratio [%] | Evaluation: Adhesion to BPA-free paint | BPA-free painting corrosion resistance | Remarks |
|---|---|---|---|---|---|---|---|---|
| F63 | 440.3 | 10.5 | 28.6 | 0.5 | 1.7 | 1 | 1 | Example |
| F64 | 281.5 | 13.2 | 23.8 | 0.1 | 3.0 | 1 | 1 | Example |
| F65 | 90.3 | 11.2 | 21.2 | 0.0 | 2.6 | 1 | 1 | Example |
| F66 | 178.7 | 12.3 | 58.2 | 0.0 | 1.2 | 4 | 4 | Comparative Example |
| F67 | 212.4 | 11.7 | 62.3 | 0.0 | 1.7 | 4 | 4 | Comparative Example |
| F68 | 163.8 | 1.5 | 55.6 | 0.0 | 0.0 | 4 | 4 | Comparative Example |
| F69 | 249.8 | 0.8 | 87.6 | 0.0 | 9.3 | 4 | 4 | Comparative Example |
| F70 | 202.3 | 2.1 | 72.2 | 0.3 | 5.4 | 4 | 4 | Comparative Example |
| F71 | 57.1 | 1.4 | 56.3 | 0.0 | 6.1 | 4 | 4 | Comparative Example |
| F72 | 98.6 | 2.8 | 27.9 | 0.1 | 11.2 | 2 | 2 | Example |
| F73 | 154.3 | 4.8 | 36.3 | 0.3 | 16.3 | 3 | 3 | Example |

Example 2

Next, surface-treated steel sheets further comprising a Sn layer disposed under the metallic Cr layer were produced and their properties were evaluated. In detail, in Example 2, surface-treated steel sheets each comprising: a steel sheet; a Sn layer disposed on at least one surface of the steel sheet; a metallic Cr layer disposed on the surface of the Sn layer; and a Cr oxide layer disposed on the metallic Cr layer were produced.

(Sn Layer)

The Sn layer was formed by Sn electroplating. Specifically, steel sheets were each subjected to electrolytic degreasing, water washing, pickling by immersion in dilute sulfuric acid, and water washing in sequence, and then subjected to Sn electroplating using a phenolsulfonic acid bath to form a Sn layer on both sides of the steel sheet, thus obtaining a Sn coated steel sheet. Here, the current passage time was varied to cause the Sn coating weight of the Sn layer to be the value shown in Tables 6 to 8. As each of the steel sheets, a steel sheet for cans (T4 blank sheet) having the Cr content shown in Tables 6 to 8 and a sheet thickness of 0.17 mm was used.

(Ni-Containing Layer)

In some examples, prior to the Sn electroplating, the steel sheet was subjected to Ni electroplating using a Watts bath to form a Ni-containing layer on both sides of the steel sheet. Here, the current passage time and the current density were varied to cause the Ni coating weight of the Ni-containing layer to be the value shown in Tables 6 to 8. The Ni coating weight of the Ni—containing layer was measured by the above-described calibration curve method using fluorescent X-rays. Each surface-treated steel sheet provided with the Ni-containing layer is a surface-treated steel sheet comprising: a steel sheet; a Ni-containing layer disposed on at least one surface of the steel sheet; a Sn layer disposed on the surface of the Ni-containing layer; a metallic Cr layer disposed on the surface of the Sn layer; and a Cr oxide layer disposed on the metallic Cr layer.

(Reflow Treatment)

Further, in some examples, reflow treatment was performed after the Sn layer was formed. In the reflow treatment, the steel sheet was heated for 5 seconds at a heating rate of 50° C./sec by a direct resistance heating method, and then introduced into water and rapidly cooled.

(Pretreatment of Sn Coated Steel Sheet)

The obtained Sn coated steel sheet was then pretreated by cathodic electrolysis treatment in a sodium bicarbonate aqueous solution. The concentration of the sodium bicarbonate aqueous solution was 10 g/L, and the temperature of the sodium bicarbonate aqueous solution was 50° C. The electric quantity density during the cathodic electrolysis treatment was 1.0 C/dm².

After the pretreatment, the Sn coated steel sheet was washed with water and, while being kept wet, subjected to a cathodic electrolysis treatment process, an immersion process, and a water washing process to obtain a surface-treated steel sheet. The cathodic electrolysis treatment process, the immersion process, and the water washing process were performed under the conditions shown in Tables 6 to 8, and all other conditions were the same as in Example 1.

For each of the obtained surface-treated steel sheets, the Cr coating weight of the metallic Cr layer per one side of the steel sheet and the Cr coating weight of the Cr oxide layer per one side of the steel sheet were measured by the same methods as in Example 1. Moreover, for each of the obtained surface-treated steel sheets, the contact angle of ethylene glycol, the amount of adsorbed elements, and the Fe atomic ratio were measured by the same methods as in Example 1. Furthermore, in this example, the Sn atomic ratio was measured by the following procedure. The measurement results are shown in Tables 9 to 11. The total of the Sn coating weight of the Sn layer and the Cr coating weight of the metallic Cr layer is also shown in Tables 9 to 11.

(Sn Atomic Ratio)

The atomic ratio of Sn to Cr on the surface of the surface-treated steel sheet was measured by XPS. No sputtering was performed in the measurement. From the integrated intensities of the narrow spectra of Sn3d and Cr2p on the surface of the sample, the atomic ratios were quantified by the relative sensibility coefficient method, and (the Sn atomic ratio)/(the Cr atomic ratio) was calculated. For the XPS measurement, a scanning X-ray photoelectron spectrometer PHI X-tool produced by ULVAC-PHI, Inc. was used. The X-ray source was a monochromatic AlKα ray, the voltage was 15 kV, the beam diameter was 100 μmφ, and the extraction angle was 45°.

Furthermore, for each of the obtained surface-treated steel sheets, adhesion to BPA-free paint and BPA-free painting corrosion resistance were evaluated by the same methods as in Example 1. The evaluation results are shown in Tables 9 to 11.

[Table 6]

TABLE 6

| No. | Production conditions: Steel sheet Cr content [%] | Sn layer, Ni-containing layer: Reflow treatment | Sn layer, Ni-containing layer: Ni coating weight [mg/m²] | Sn layer, Ni-containing layer: Sn coating weight [mg/m²] | Cathodic electrolysis treatment: Electrolyte | Cathodic electrolysis treatment: Electric quantity density [C/dm²] | Immersion treatment: Electrolyte | Immersion treatment: Immersion time [sec] | Water washing treatment, First time: Method | Water washing treatment, First time: Conductivity [µS/m] |
|---|---|---|---|---|---|---|---|---|---|---|
| S1 | 0.04 | Performed | — | 2802 | A | 10 | A | 3.23 | Immersion | 16 |
| S2 | 0.04 | Performed | — | 2803 | B | 8 | B | 2.87 | Spray | 21 |
| S3 | 0.04 | Performed | — | 2789 | C | 20 | C | 3.10 | Spray | 29 |
| S4 | 0.04 | Performed | — | 2813 | D | 20 | D | 1.80 | Spray | 22 |
| S5 | 0.04 | Performed | — | 2816 | E | 100 | E | 2.11 | Spray | 13 |
| S6 | 0.04 | Performed | — | 2805 | F | 160 | F | 3.87 | Immersion | 7 |
| S7 | 0.04 | Performed | — | 2795 | A | 120 | A | 1.56 | Spray | 8 |
| S8 | 0.04 | Performed | — | 2806 | B | 240 | B | 2.25 | Immersion | 11 |
| S9 | 0.04 | Performed | — | 2803 | C | 400 | C | 3.31 | Immersion | 12 |
| S10 | 0.04 | Performed | — | 2801 | D | 300 | D | 1.74 | Immersion | 10 |
| S11 | 0.04 | Performed | — | 2809 | E | 280 | E | 1.58 | Immersion | 36 |
| S12 | 0.04 | Performed | — | 2763 | F | 80 | F | 2.65 | Immersion | 15 |
| S13 | 0.04 | Performed | — | 2803 | A | 360 | A | 3.98 | Immersion | 9 |
| S14 | 0.04 | Performed | — | 2841 | B | 180 | B | 2.49 | Immersion | 39 |
| S15 | 0.04 | Performed | — | 2803 | C | 40 | C | 3.54 | Immersion | 106 |
| S16 | 0.04 | Performed | — | 2815 | D | 40 | D | 2.67 | Immersion | 33 |
| S17 | 0.04 | Performed | — | 5625 | E | 20 | E | 3.20 | Immersion | 12 |
| S18 | 0.04 | Performed | — | 8432 | F | 40 | F | 1.83 | Immersion | 11 |
| S19 | 0.04 | Performed | — | 11189 | A | 80 | A | 2.63 | Immersion | 15 |
| S20 | 0.04 | Not performed | — | 2769 | B | 10 | B | 3.76 | Immersion | 9 |
| S21 | 0.04 | Not performed | — | 5584 | C | 40 | C | 1.69 | Immersion | 16 |
| S22 | 0.04 | Not performed | — | 8388 | D | 10 | D | 2.71 | Immersion | 14 |
| S23 | 0.04 | Not performed | — | 11232 | E | 4 | E | 3.10 | Immersion | 13 |
| S24 | 0.04 | Performed | 3 | 798 | F | 10 | F | 2.45 | Immersion | 7 |
| S25 | 0.04 | Performed | 6 | 903 | A | 10 | A | 1.76 | Immersion | 10 |
| S26 | 0.04 | Performed | 10 | 1021 | B | 20 | B | 2.83 | Immersion | 11 |
| S27 | 0.04 | Performed | 42 | 396 | C | 20 | C | 2.43 | Immersion | 19 |
| S28 | 0.04 | Performed | 101 | 306 | D | 10 | D | 2.41 | Immersion | 22 |
| S29 | 0.04 | Not performed | 2 | 803 | E | 10 | E | 2.95 | Immersion | 29 |
| S30 | 0.04 | Not performed | 5 | 912 | F | 10 | F | 3.13 | Immersion | 19 |
| S31 | 0.04 | Not performed | 11 | 1023 | A | 10 | A | 2.70 | Immersion | 21 |
| S32 | 0.04 | Not performed | 36 | 412 | B | 20 | B | 1.92 | Immersion | 26 |
| S33 | 0.04 | Not performed | 123 | 303 | C | 10 | C | 2.01 | Immersion | 24 |
| S34 | 0.04 | Performed | — | 113 | D | 10 | D | 3.17 | Immersion | 22 |
| S35 | 0.04 | Performed | — | 43 | E | 12 | E | 2.67 | Immersion | 14 |

| No. | Production conditions, Water washing treatment, Second time: Method | Second time: Conductivity [µS/m] | Third time: Method | Third time: Conductivity [µS/m] | Fourth time: Method | Fourth time: Conductivity [µS/m] | Fifth time: Method | Fifth time: Conductivity [µS/m] | Remarks |
|---|---|---|---|---|---|---|---|---|---|
| S1 | — | — | — | — | — | — | — | — | Example |
| S2 | — | — | — | — | — | — | — | — | Example |
| S3 | Immersion | 21 | — | — | — | — | — | — | Example |
| S4 | Spray | 16 | — | — | — | — | — | — | Example |
| S5 | Immersion | 8 | Immersion | 16 | — | — | — | — | Example |
| S6 | Immersion | 17 | Spray | 22 | — | — | — | — | Example |
| S7 | Immersion | 11 | Immersion | 13 | Immersion | 15 | — | — | Example |
| S8 | Immersion | 18 | Spray | 20 | Spray | 12 | — | — | Example |
| S9 | Immersion | 21 | Immersion | 15 | Immersion | 28 | Immersion | 10 | Example |
| S10 | Spray | 15 | Spray | 13 | Immersion | 24 | Spray | 8 | Example |
| S11 | Immersion | 11 | Spray | 8 | — | — | — | — | Example |
| S12 | Spray | 58 | Spray | 16 | — | — | — | — | Example |
| S13 | Immersion | 105 | Spray | 28 | — | — | — | — | Example |
| S14 | Spray | 83 | Spray | 15 | — | — | — | — | Example |
| S15 | Immersion | 72 | Spray | 13 | — | — | — | — | Example |
| S16 | Spray | 201 | Spray | 17 | — | — | — | — | Example |

TABLE 6-continued

| | | | | | | | | | |
|---|---|---|---|---|---|---|---|---|---|
| S17 | Spray | 23 | — | — | — | — | — | — | Example |
| S18 | Spray | 16 | — | — | — | — | — | — | Example |
| S19 | Spray | 20 | — | — | — | — | — | — | Example |
| S20 | Spray | 15 | — | — | — | — | — | — | Example |
| S21 | Spray | 13 | — | — | — | — | — | — | Example |
| S22 | Spray | 23 | — | — | — | — | — | — | Example |
| S23 | Spray | 20 | — | — | — | — | — | — | Example |
| S24 | Spray | 11 | — | — | — | — | — | — | Example |
| S25 | Spray | 9 | — | — | — | — | — | — | Example |
| S26 | Spray | 18 | — | — | — | — | — | — | Example |
| S27 | Spray | 26 | — | — | — | — | — | — | Example |
| S28 | Spray | 25 | — | — | — | — | — | — | Example |
| S29 | Spray | 22 | — | — | — | — | — | — | Example |
| S30 | Spray | 10 | — | — | — | — | — | — | Example |
| S31 | Spray | 29 | — | — | — | — | — | — | Example |
| S32 | Spray | 21 | — | — | — | — | — | — | Example |
| S33 | Spray | 17 | — | — | — | — | — | — | Example |
| S34 | Spray | 11 | — | — | — | — | — | — | Example |
| S35 | Spray | 8 | — | — | — | — | — | — | Example |

[Table 7]

TABLE 7

| | Production conditions | | | | | | | | | |
|---|---|---|---|---|---|---|---|---|---|---|
| | Steel sheet | Sn layer, Ni-containing layer | | | Cathodic electrolysis treatment | | Immersion treatment | | Water washing treatment | |
| | | | | | | | | | First time | |
| No. | Cr content [%] | Reflow treatment | Ni coating weight [mg/m$^2$] | Sn coating weight [mg/m$^2$] | Electrolyte | Electric quantity density [C/dm$^2$] | Electrolyte | Immersion time [sec] | Method | Conductivity [μS/m] |
| S36 | 0.04 | Performed | — | 23 | F | 80 | F | 4.16 | Immersion | 16 |
| S37 | 0.04 | Performed | — | 5 | A | 100 | A | 2.51 | Immersion | 13 |
| S38 | 0.04 | Performed | — | 4 | B | 40 | B | 1.98 | Immersion | 11 |
| S39 | 0.04 | Performed | — | 1 | C | 100 | C | 2.87 | Immersion | 15 |
| S40 | 0.04 | Not performed | — | 203 | D | 12 | D | 2.42 | Immersion | 9 |
| S41 | 0.04 | Not performed | — | 59 | E | 4 | E | 3.35 | Immersion | 10 |
| S42 | 0.04 | Not performed | — | 32 | F | 40 | F | 3.10 | Immersion | 20 |
| S43 | 0.04 | Not performed | — | 6 | A | 80 | A | 2.78 | Immersion | 21 |
| S44 | 0.04 | Not performed | — | 3 | B | 140 | B | 1.64 | Immersion | 11 |
| S45 | 0.04 | Not performed | — | 1 | C | 80 | C | 2.36 | Immersion | 26 |
| S46 | 0.04 | Performed | — | 82 | D | 4 | D | 1.97 | Immersion | 19 |
| S47 | 0.04 | Performed | — | 165 | E | 1 | E | 2.41 | Immersion | 27 |
| S48 | 0.04 | Not performed | — | 20 | F | 480 | F | 3.38 | Immersion | 16 |
| S49 | 0.04 | Not performed | — | 15 | A | 520 | A | 4.41 | Immersion | 21 |
| S50 | 0.04 | Not performed | — | 20 | B | 20 | B | 4.02 | Immersion | 22 |
| S51 | 0.04 | Not performed | — | 14 | C | 20 | C | 1.88 | Immersion | 28 |
| S52 | 0.04 | Performed | — | 2803 | D | 4 | D | 2.62 | Immersion | 36 |
| S53 | 0.04 | Performed | — | 2805 | E | 20 | E | 4.39 | Spray | 42 |
| S54 | 0.04 | Performed | — | 2813 | F | 20 | F | 2.64 | Immersion | 59 |
| S55 | 0.04 | Performed | — | 2767 | A | 20 | A | 2.45 | Spray | 72 |
| S56 | 0.04 | Performed | — | 2798 | B | 10 | B | 2.83 | Immersion | 108 |
| S57 | 0.04 | Performed | — | 2800 | C | 40 | C | 1.73 | Spray | 234 |
| S58 | 0.04 | Performed | — | 2779 | D | 80 | D | 2.22 | Immersion | 23 |
| S59 | 0.04 | Performed | — | 2803 | E | 40 | E | 3.46 | Immersion | 15 |
| S60 | 0.04 | Performed | — | 2780 | F | 30 | F | 2.83 | Immersion | 18 |
| S61 | 0.04 | Performed | — | 2811 | A | 20 | A | 1.59 | Immersion | 8 |
| S62 | 0.04 | Performed | — | 2790 | B | 30 | B | 2.37 | Immersion | 16 |
| S63 | 0.04 | Performed | — | 2832 | C | 120 | C | 2.16 | Immersion | 11 |
| S64 | 0.04 | Performed | — | 2824 | D | 80 | D | 3.79 | Immersion | 12 |
| S65 | 0.04 | Performed | — | 2833 | E | 320 | E | 4.25 | Spray | 18 |
| S66 | 0.04 | Performed | — | 2805 | F | 300 | F | 1.65 | Immersion | 19 |
| S67 | 0.04 | Performed | — | 2779 | A | 100 | A | 3.38 | Immersion | 11 |
| S68 | 0.04 | Performed | — | 2810 | B | 40 | B | 2.68 | Immersion | 8 |
| S69 | 0.04 | Performed | — | 2796 | C | 20 | C | 1.55 | Immersion | 9 |
| S70 | 0.04 | Performed | — | 2806 | D | 30 | D | 2.69 | Immersion | 10 |

TABLE 7-continued

| No. | Production conditions / Water washing treatment / Second time / Method | Second time / Conductivity [μS/m] | Third time / Method | Third time / Conductivity [μS/m] | Fourth time / Method | Fourth time / Conductivity [μS/m] | Fifth time / Method | Fifth time / Conductivity [μS/m] | Remarks |
|---|---|---|---|---|---|---|---|---|---|
| S36 | Spray | 10 | — | — | — | — | — | — | Example |
| S37 | Spray | 12 | — | — | — | — | — | — | Example |
| S38 | Spray | 10 | — | — | — | — | — | — | Example |
| S39 | Spray | 19 | — | — | — | — | — | — | Example |
| S40 | Spray | 26 | — | — | — | — | — | — | Example |
| S41 | Spray | 21 | — | — | — | — | — | — | Example |
| S42 | Spray | 16 | — | — | — | — | — | — | Example |
| S43 | Spray | 17 | — | — | — | — | — | — | Example |
| S44 | Spray | 12 | — | — | — | — | — | — | Example |
| S45 | Spray | 18 | — | — | — | — | — | — | Example |
| S46 | Spray | 22 | — | — | — | — | — | — | Example |
| S47 | Spray | 23 | — | — | — | — | — | — | Example |
| S48 | Spray | 24 | — | — | — | — | — | — | Example |
| S49 | Spray | 15 | — | — | — | — | — | — | Example |
| S50 | Spray | 8 | — | — | — | — | — | — | Example |
| S51 | Spray | 12 | — | — | — | — | — | — | Example |
| S52 | — | — | — | — | — | — | — | — | Example |
| S53 | — | — | — | — | — | — | — | — | Example |
| S54 | — | — | — | — | — | — | — | — | Example |
| S55 | — | — | — | — | — | — | — | — | Example |
| S56 | — | — | — | — | — | — | — | — | Comparative Example |
| S57 | — | — | — | — | — | — | — | — | Comparative Example |
| S58 | Immersion | 32 | — | — | — | — | — | — | Example |
| S59 | Spray | 49 | — | — | — | — | — | — | Example |
| S60 | Immersion | 84 | — | — | — | — | — | — | Example |
| S61 | Spray | 91 | — | — | — | — | — | — | Example |
| S62 | Immersion | 125 | — | — | — | — | — | — | Comparative Example |
| S63 | Spray | 162 | — | — | — | — | — | — | Comparative Example |
| S64 | Immersion | 21 | Immersion | 43 | — | — | — | — | Example |
| S65 | Immersion | 23 | Spray | 36 | — | — | — | — | Example |
| S66 | Spray | 16 | Immersion | 67 | — | — | — | — | Example |
| S67 | Immersion | 12 | Spray | 72 | — | — | — | — | Example |
| S68 | Spray | 24 | Immersion | 105 | — | — | — | — | Comparative Example |
| S69 | Immersion | 28 | Spray | 170 | — | — | — | — | Comparative Example |
| S70 | Immersion | 11 | Spray | 26 | Immersion | 37 | — | — | Example |

[Table 8]

TABLE 8

| No. | Production conditions / Steel sheet / Cr content [%] | Sn layer, Ni-containing layer / Reflow treatment | Sn layer, Ni-containing layer / Ni coating weight [mg/m$^2$] | Sn layer, Ni-containing layer / Sn coating weight [mg/m$^2$] | Cathodic electrolysis treatment / Electrolyte | Cathodic electrolysis treatment / Electric quantity density [C/dm$^2$] | Immersion treatment / Electrolyte | Immersion treatment / Immersion time [sec] | Water washing treatment / First time / Method | Water washing treatment / First time / Conductivity [μS/m] |
|---|---|---|---|---|---|---|---|---|---|---|
| S71 | 0.04 | Performed | — | 2803 | E | 10 | E | 3.74 | Immersion | 20 |
| S72 | 0.04 | Performed | — | 2824 | F | 4 | F | 4.19 | Immersion | 26 |
| S73 | 0.04 | Performed | — | 2798 | A | 2 | A | 2.23 | Spray | 28 |
| S74 | 0.04 | Performed | — | 2708 | B | 20 | B | 2.43 | Immersion | 23 |
| S75 | 0.04 | Performed | — | 2806 | C | 4 | C | 2.77 | Spray | 22 |
| S76 | 0.04 | Performed | — | 2829 | D | 8 | D | 3.64 | Immersion | 16 |
| S77 | 0.04 | Performed | — | 2843 | E | 20 | E | 2.83 | Immersion | 11 |
| S78 | 0.04 | Performed | — | 2783 | F | 320 | F | 2.74 | Immersion | 17 |
| S79 | 0.04 | Performed | — | 2796 | A | 240 | A | 1.68 | Immersion | 14 |

TABLE 8-continued

| | | | | | | | | | | |
|---|---|---|---|---|---|---|---|---|---|---|
| S80 | 0.04 | Performed | — | 2832 | B | 20 | B | 3.20 | Immersion | 12 |
| S81 | 0.04 | Performed | — | 2819 | C | 30 | C | 2.16 | Immersion | 11 |
| S82 | 0.04 | Performed | — | 2759 | D | 20 | D | 1.95 | No water washing | — |
| S83 | 0.04 | Performed | — | 2807 | G | 10 | G | 2.34 | Immersion | 12 |
| S84 | 0.04 | Performed | — | 2815 | G | 10 | G | 3.41 | Immersion | 19 |
| S85 | 0.04 | Performed | — | 2834 | D | 20 | E | 1.32 | Spray | 13 |
| S86 | 0.04 | Performed | — | 2789 | F | 20 | F | 1.08 | Spray | 11 |
| S87 | 0.04 | Performed | — | 2806 | A | 40 | A | 0.73 | Spray | 18 |
| S88 | 0.04 | Performed | — | 2801 | B | 25 | B | 4.13 | Spray | 24 |
| S89 | 0.04 | Performed | — | 2819 | C | 25 | C | 4.64 | Spray | 22 |
| S90 | 0.04 | Performed | — | 2803 | D | 20 | D | 5.13 | Spray | 29 |
| S91 | 0.04 | Performed | — | 2768 | A | 10 | B | 3.61 | Spray | 14 |
| S92 | 0.04 | Performed | — | 2832 | B | 25 | D | 2.36 | Spray | 17 |
| S93 | 0.04 | Performed | — | 2838 | C | 30 | F | 2.79 | Spray | 28 |
| S94 | 0.04 | Performed | — | 2811 | D | 20 | E | 3.95 | Spray | 21 |
| S95 | 0.04 | Performed | — | 2805 | E | 40 | A | 4.08 | Spray | 20 |
| S96 | 0.04 | Performed | — | 2803 | F | 40 | C | 2.46 | Spray | 9 |
| S97 | 0.04 | Performed | — | 2791 | B | 20 | G | 3.79 | Spray | 17 |
| S98 | 0.04 | Performed | — | 2783 | C | 30 | G | 3.09 | Spray | 11 |
| S99 | 0.04 | Performed | — | 2779 | E | 30 | G | 1.99 | Spray | 23 |
| S100 | 0.04 | Performed | — | 2837 | G | 160 | A | 2.84 | Spray | 28 |
| S101 | 0.04 | Performed | — | 2819 | G | 20 | D | 3.17 | Spray | 21 |
| S102 | 0.04 | Performed | — | 2824 | G | 4 | F | 4.34 | Spray | 8 |
| S103 | 0.09 | Performed | — | 2803 | E | 10 | E | 3.69 | Spray | 25 |
| S104 | 0.12 | Performed | — | 2805 | F | 10 | F | 2.55 | Spray | 24 |

| | Production conditions Water washing treatment | | | | | | | | |
|---|---|---|---|---|---|---|---|---|---|
| | Second time | | Third time | | Fourth time | | Fifth time | | |
| No. | Method | Conductivity [μS/m] | Method | Conductivity [μS/m] | Method | Conductivity [μS/m] | Method | Conductivity [μS/m] | Remarks |
| S71 | Spray | 21 | Immersion | 27 | Spray | 41 | — | — | Example |
| S72 | Immersion | 24 | Spray | 17 | Immersion | 58 | — | — | Example |
| S73 | Immersion | 21 | Spray | 22 | Spray | 83 | — | — | Example |
| S74 | Immersion | 20 | Spray | 18 | Immersion | 111 | — | — | Comparative Example |
| S75 | Immersion | 9 | Spray | 15 | Spray | 123 | — | — | Comparative Example |
| S76 | Spray | 11 | Spray | 8 | Immersion | 24 | Immersion | 34 | Example |
| S77 | Spray | 26 | Immersion | 18 | Immersion | 20 | Spray | 39 | Example |
| S78 | Immersion | 13 | Spray | 16 | Immersion | 21 | Immersion | 57 | Example |
| S79 | Immersion | 19 | Spray | 10 | Immersion | 16 | Spray | 68 | Example |
| S80 | Immersion | 21 | Spray | 11 | Immersion | 9 | Immersion | 120 | Comparative Example |
| S81 | Immersion | 10 | Spray | 25 | Immersion | 15 | Spray | 114 | Comparative Example |
| S82 | — | — | — | — | — | — | — | — | Comparative Example |
| S83 | Immersion | 23 | Spray | 17 | — | — | — | — | Comparative Example |
| S84 | Spray | 13 | Immersion | 21 | — | — | — | — | Comparative Example |
| S85 | Spray | 15 | — | — | — | — | — | — | Example |
| S86 | Spray | 21 | — | — | — | — | — | — | Example |
| S87 | Spray | 22 | — | — | — | — | — | — | Comparative Example |
| S88 | Spray | 16 | — | — | — | — | — | — | Example |
| S89 | Spray | 21 | — | — | — | — | — | — | Example |
| S90 | Spray | 24 | — | — | — | — | — | — | Comparative Example |
| S91 | Spray | 19 | — | — | — | — | — | — | Example |
| S92 | Spray | 8 | — | — | — | — | — | — | Example |
| S93 | Spray | 18 | — | — | — | — | — | — | Example |
| S94 | Spray | 22 | — | — | — | — | — | — | Example |
| S95 | Spray | 29 | — | — | — | — | — | — | Example |
| S96 | Spray | 15 | — | — | — | — | — | — | Example |
| S97 | Spray | 11 | — | — | — | — | — | — | Comparative Example |
| S98 | Spray | 19 | — | — | — | — | — | — | Comparative Example |
| S99 | Spray | 12 | — | — | — | — | — | — | Comparative Example |
| S100 | Spray | 21 | — | — | — | — | — | — | Comparative Example |

TABLE 8-continued

| | | | | | | | | | |
|---|---|---|---|---|---|---|---|---|---|
| S101 | Spray | 16 | — | — | — | — | — | — | Comparative Example |
| S102 | Spray | 13 | — | — | — | — | — | — | Comparative Example |
| S103 | Spray | 21 | — | — | — | — | — | — | Example |
| S104 | Spray | 27 | — | — | — | — | — | — | Example |

[Table 9]

TABLE 9

| | Measurement results | | | | | | Evaluation | | |
|---|---|---|---|---|---|---|---|---|---|
| No. | Metallic Cr layer Cr coating weight [mg/m²] | Cr oxide layer Cr coating weight [mg/m²] | Total of Sn coating weight and Cr coating weight of metallic Cr layer [mg/m²] | Contact angle of ethylene glycol [°] | Atomic ratio of adsorbed elements [%] | Sn atomic ratio [%] | Adhesion to BPA-free paint | BPA-free painting corrosion resistance | Remarks |
| S1 | 12.3 | 0.3 | 2814.3 | 32.5 | 0.0 | 52.1 | 1 | 1 | Example |
| S2 | 5.3 | 3.2 | 2808.3 | 26.5 | 0.0 | 74.2 | 1 | 1 | Example |
| S3 | 16.5 | 5.6 | 2805.5 | 41.3 | 0.0 | 16.5 | 1 | 1 | Example |
| S4 | 20.3 | 2.1 | 2833.3 | 22.3 | 0.5 | 13.5 | 1 | 1 | Example |
| S5 | 102.5 | 4.6 | 2918.5 | 13.5 | 0.1 | 26.6 | 1 | 1 | Example |
| S6 | 162.3 | 8.9 | 2967.3 | 35.4 | 0.0 | 1.8 | 1 | 1 | Example |
| S7 | 115.5 | 13.3 | 2910.5 | 20.5 | 0.0 | 0.0 | 1 | 1 | Example |
| S8 | 209.3 | 7.2 | 3015.3 | 16.8 | 0.3 | 0.0 | 1 | 1 | Example |
| S9 | 426.5 | 14.3 | 3229.5 | 17.5 | 0.2 | 0.0 | 1 | 1 | Example |
| S10 | 307.5 | 4.8 | 3108.5 | 13.6 | 0.0 | 0.0 | 1 | 1 | Example |
| S11 | 274.8 | 2.1 | 3083.8 | 22.7 | 0.0 | 0.0 | 1 | 1 | Example |
| S12 | 85.6 | 3.2 | 2848.6 | 28.9 | 0.0 | 0.0 | 1 | 1 | Example |
| S13 | 335.4 | 3.6 | 3138.4 | 36.7 | 0.7 | 0.0 | 1 | 1 | Example |
| S14 | 201.2 | 5.9 | 3042.2 | 43.5 | 0.8 | 13.6 | 1 | 1 | Example |
| S15 | 50.1 | 5.7 | 2853.1 | 30.8 | 0.4 | 32.6 | 1 | 1 | Example |
| S16 | 63.6 | 8.6 | 2878.6 | 29.4 | 0.0 | 11.9 | 1 | 1 | Example |
| S17 | 17.5 | 7.6 | 5642.5 | 24.3 | 0.0 | 62.4 | 1 | 1 | Example |
| S18 | 43.2 | 3.7 | 8475.2 | 18.9 | 0.0 | 63.8 | 1 | 1 | Example |
| S19 | 95.7 | 4.8 | 11284.7 | 14.2 | 0.0 | 54.0 | 1 | 1 | Example |
| S20 | 12.6 | 1.6 | 2781.6 | 34.6 | 0.1 | 42.3 | 1 | 1 | Example |
| S21 | 32.4 | 0.1 | 5616.4 | 21.6 | 0.2 | 16.5 | 1 | 1 | Example |
| S22 | 6.7 | 0.5 | 8394.7 | 31.2 | 0.0 | 22.9 | 1 | 1 | Example |
| S23 | 8.2 | 1.5 | 11240.2 | 26.5 | 0.0 | 31.8 | 1 | 1 | Example |
| S24 | 12.3 | 4.5 | 810.3 | 32.7 | 0.0 | 47.6 | 1 | 1 | Example |
| S25 | 13.5 | 6.8 | 916.5 | 32.4 | 0.5 | 33.8 | 1 | 1 | Example |
| S26 | 22.7 | 11.2 | 1043.7 | 18.7 | 0.0 | 16.7 | 1 | 1 | Example |
| S27 | 18.9 | 9.0 | 414.9 | 22.5 | 0.0 | 32.6 | 1 | 1 | Example |
| S28 | 8.3 | 2.6 | 314.3 | 19.1 | 0.0 | 16.5 | 1 | 1 | Example |
| S29 | 6.2 | 5.4 | 809.2 | 25.7 | 0.7 | 37.8 | 1 | 1 | Example |
| S30 | 11.3 | 6.0 | 923.3 | 31.9 | 0.0 | 78.9 | 1 | 1 | Example |
| S31 | 13.5 | 3.5 | 1036.5 | 33.0 | 0.0 | 6.3 | 1 | 1 | Example |
| S32 | 22.6 | 12.1 | 434.6 | 26.1 | 0.6 | 16.4 | 1 | 1 | Example |
| S33 | 7.9 | 10.3 | 310.9 | 11.6 | 0.0 | 3.7 | 1 | 1 | Example |
| S34 | 8.6 | 9.7 | 121.6 | 16.4 | 0.0 | 50.1 | 1 | 1 | Example |
| S35 | 10.1 | 5.7 | 53.1 | 21.4 | 0.0 | 23.0 | 1 | 1 | Example |

[Table 10]

TABLE 10

| | Measurement results | | | | | | Evaluation | | |
|---|---|---|---|---|---|---|---|---|---|
| No. | Metallic Cr layer Cr coating weight [mg/m²] | Cr oxide layer Cr coating weight [mg/m²] | Total of Sn coating weight and Cr coating weight of metallic Cr layer [mg/m²] | Contact angle of ethylene glycol [°] | Atomic ratio of adsorbed elements [%] | Sn atomic ratio [%] | Adhesion to BPA-free paint | BPA-free painting corrosion resistance | Remarks |
| S36 | 68.3 | 4.0 | 91.3 | 33.2 | 0.7 | 5.2 | 1 | 1 | Example |
| S37 | 126.3 | 6.3 | 131.3 | 38.0 | 0.0 | 24.5 | 1 | 1 | Example |
| S38 | 56.8 | 2.6 | 60.8 | 26.1 | 0.0 | 11.3 | 1 | 2 | Example |
| S39 | 82.3 | 3.7 | 83.3 | 38.9 | 0.0 | 16.5 | 1 | 3 | Example |
| S40 | 12.2 | 1.3 | 215.2 | 21.3 | 0.1 | 32.3 | 1 | 1 | Example |
| S41 | 5.6 | 3.2 | 64.6 | 22.7 | 0.0 | 46.3 | 1 | 1 | Example |

TABLE 10-continued

| No. | Measurement results: Metallic Cr layer Cr coating weight [mg/m²] | Cr oxide layer Cr coating weight [mg/m²] | Total of Sn coating weight and Cr coating weight of metallic Cr layer [mg/m²] | Contact angle of ethylene glycol [°] | Atomic ratio of adsorbed elements [%] | Sn atomic ratio [%] | Evaluation: Adhesion to BPA-free paint | BPA-free painting corrosion resistance | Remarks |
|---|---|---|---|---|---|---|---|---|---|
| S42 | 41.0 | 5.6 | 73.0 | 37.8 | 0.0 | 13.6 | 1 | 1 | Example |
| S43 | 93.6 | 8.3 | 99.6 | 34.5 | 0.3 | 8.5 | 1 | 1 | Example |
| S44 | 156.2 | 4.9 | 159.2 | 31.6 | 0.8 | 0.0 | 1 | 2 | Example |
| S45 | 103.0 | 5.0 | 104.0 | 32.3 | 0.0 | 7.6 | 1 | 3 | Example |
| S46 | 4.6 | 2.3 | 86.6 | 27.4 | 0.0 | 68.3 | 1 | 2 | Example |
| S47 | 1.3 | 4.6 | 166.3 | 21.6 | 0.0 | 79.8 | 1 | 3 | Example |
| S48 | 462.7 | 2.2 | 482.7 | 23.6 | 0.0 | 1.2 | 2 | 2 | Example |
| S49 | 531.3 | 0.3 | 546.3 | 22.7 | 0.2 | 4.3 | 3 | 3 | Example |
| S50 | 22.5 | 1.2 | 42.5 | 27.5 | 0.7 | 13.6 | 2 | 2 | Example |
| S51 | 23.8 | 7.8 | 37.8 | 34.5 | 0.0 | 1.2 | 3 | 3 | Example |
| S52 | 6.0 | 14.2 | 2809.0 | 33.3 | 1.6 | 3.8 | 2 | 2 | Example |
| S53 | 14.2 | 3.0 | 2819.2 | 30.4 | 2.1 | 16.2 | 2 | 2 | Example |
| S54 | 15.3 | 11.2 | 2828.3 | 24.5 | 3.8 | 33.5 | 3 | 3 | Example |
| S55 | 11.3 | 2.5 | 2778.3 | 22.3 | 4.7 | 18.3 | 3 | 3 | Example |
| S56 | 12.1 | 3.8 | 2810.1 | 21.9 | 6.8 | 22.5 | 4 | 4 | Comparative Example |
| S57 | 26.9 | 4.7 | 2826.9 | 24.0 | 5.5 | 30.3 | 4 | 4 | Comparative Example |
| S58 | 78.5 | 5.9 | 2857.5 | 21.9 | 1.1 | 41.3 | 2 | 2 | Example |
| S59 | 41.2 | 6.7 | 2844.2 | 27.5 | 1.6 | 22.9 | 2 | 2 | Example |
| S60 | 34.2 | 3.7 | 2814.2 | 24.3 | 3.2 | 32.6 | 3 | 3 | Example |
| S61 | 16.9 | 4.8 | 2827.9 | 14.7 | 3.6 | 13.8 | 3 | 3 | Example |
| S62 | 32.4 | 1.2 | 2822.4 | 17.8 | 8.3 | 31.2 | 4 | 4 | Comparative Example |
| S63 | 100.1 | 0.7 | 2932.1 | 15.0 | 5.4 | 0.0 | 4 | 4 | Comparative Example |
| S64 | 89.3 | 1.2 | 2913.3 | 37.8 | 2.0 | 13.8 | 2 | 2 | Example |
| S65 | 361.2 | 3.8 | 3194.2 | 41.5 | 2.7 | 1.1 | 2 | 2 | Example |
| S66 | 313.5 | 3.5 | 3118.5 | 40.3 | 4.8 | 2.4 | 3 | 3 | Example |
| S67 | 121.2 | 4.6 | 2900.2 | 22.1 | 4.1 | 0.0 | 3 | 3 | Example |
| S68 | 51.2 | 3.8 | 2861.2 | 23.8 | 5.4 | 41.3 | 4 | 4 | Comparative Example |
| S69 | 22.5 | 8.9 | 2818.5 | 21.9 | 6.1 | 16.3 | 4 | 4 | Comparative Example |
| S70 | 31.2 | 9.3 | 2837.2 | 18.5 | 1.9 | 32.4 | 2 | 2 | Example |

[Table 11]

TABLE 11

| No. | Measurement results: Metallic Cr layer Cr coating weight [mg/m²] | Cr oxide layer Cr coating weight [mg/m²] | Total of Sn coating weight and Cr coating weight of metallic Cr layer [mg/m²] | Contact angle of ethylene glycol [°] | Atomic ratio of adsorbed elements [%] | Sn atomic ratio [%] | Evaluation: Adhesion to BPA-free paint | BPA-free painting corrosion resistance | Remarks |
|---|---|---|---|---|---|---|---|---|---|
| S71 | 12.3 | 4.6 | 2815.3 | 17.2 | 2.3 | 33.3 | 2 | 2 | Example |
| S72 | 7.6 | 13.8 | 2831.6 | 25.5 | 4.1 | 65.4 | 3 | 3 | Example |
| S73 | 6.1 | 10.4 | 2804.1 | 16.8 | 3.7 | 41.3 | 3 | 3 | Example |
| S74 | 13.5 | 7.8 | 2721.5 | 32.4 | 5.7 | 31.0 | 4 | 4 | Comparative Example |
| S75 | 8.6 | 4.5 | 2814.6 | 41.8 | 6.4 | 14.2 | 4 | 4 | Comparative Example |
| S76 | 8.9 | 2.1 | 2837.9 | 28.3 | 2.5 | 32.3 | 2 | 2 | Example |
| S77 | 14.6 | 3.0 | 2857.6 | 22.7 | 2.7 | 16.5 | 2 | 2 | Example |
| S78 | 302.4 | 3.8 | 3085.4 | 20.6 | 3.3 | 0.0 | 3 | 3 | Example |
| S79 | 211.3 | 7.5 | 3007.3 | 27.9 | 3.4 | 0.0 | 3 | 3 | Example |
| S80 | 12.5 | 4.3 | 2844.5 | 34.9 | 5.8 | 13.7 | 4 | 4 | Comparative Example |
| S81 | 32.3 | 2.4 | 2851.3 | 27.5 | 7.2 | 33.1 | 4 | 4 | Comparative Example |
| S82 | 16.5 | 5.6 | 2775.5 | 78.3 | 6.8 | 51.0 | 4 | 4 | Comparative Example |
| S83 | 10.6 | 5.2 | 2817.6 | 52.7 | 0.0 | 43.5 | 4 | 4 | Comparative Example |
| S84 | 14.0 | 6.4 | 2829.0 | 63.8 | 0.0 | 19.6 | 4 | 4 | Comparative Example |
| S85 | 17.8 | 6.8 | 2851.8 | 45.6 | 0.0 | 20.3 | 2 | 2 | Example |
| S86 | 28.5 | 3.5 | 2817.5 | 49.1 | 0.0 | 30.5 | 3 | 3 | Example |
| S87 | 26.2 | 8.9 | 2832.2 | 53.5 | 0.0 | 12.3 | 4 | 4 | Comparative Example |

TABLE 11-continued

| | Measurement results | | | | | | Evaluation | | |
|---|---|---|---|---|---|---|---|---|---|
| No. | Metallic Cr layer Cr coating weight [mg/m²] | Cr oxide layer Cr coating weight [mg/m²] | Total of Sn coating weight and Cr coating weight of metallic Cr layer [mg/m²] | Contact angle of ethylene glycol [°] | Atomic ratio of adsorbed elements [%] | Sn atomic ratio [%] | Adhesion to BPA-free paint | BPA-free painting corrosion resistance | Remarks |
| S88 | 23.8 | 7.9 | 2824.8 | 46.2 | 0.3 | 23.0 | 2 | 2 | Example |
| S89 | 22.5 | 4.5 | 2841.5 | 48.3 | 0.0 | 32.5 | 3 | 3 | Example |
| S90 | 32.3 | 11.7 | 2835.3 | 61.7 | 0.1 | 16.5 | 4 | 4 | Comparative Example |
| S91 | 11.5 | 3.7 | 2779.5 | 33.6 | 0.0 | 74.5 | 1 | 1 | Example |
| S92 | 15.8 | 12.5 | 2847.8 | 43.8 | 0.0 | 55.4 | 1 | 1 | Example |
| S93 | 32.1 | 8.6 | 2870.1 | 24.4 | 0.0 | 13.8 | 1 | 1 | Example |
| S94 | 23.5 | 1.6 | 2834.5 | 29.0 | 0.5 | 16.5 | 1 | 1 | Example |
| S95 | 42.5 | 0.2 | 2847.5 | 18.4 | 0.0 | 53.8 | 1 | 1 | Example |
| S96 | 60.8 | 6.4 | 2863.8 | 16.6 | 0.0 | 12.9 | 1 | 1 | Example |
| S97 | 22.5 | 2.1 | 2813.5 | 72.1 | 0.0 | 32.6 | 4 | 4 | Comparative Example |
| S98 | 32.6 | 3.6 | 2815.6 | 68.3 | 0.6 | 19.3 | 4 | 4 | Comparative Example |
| S99 | 33.8 | 4.8 | 2812.8 | 51.3 | 0.0 | 8.9 | 4 | 4 | Comparative Example |
| S100 | 129.6 | 9.8 | 2966.6 | 68.9 | 0.0 | 2.1 | 4 | 4 | Comparative Example |
| S101 | 13.8 | 5.2 | 2832.8 | 53.5 | 0.0 | 10.6 | 4 | 4 | Comparative Example |
| S102 | 7.4 | 1.7 | 2831.4 | 57.8 | 0.4 | 33.5 | 4 | 4 | Comparative Example |
| S103 | 11.1 | 4.7 | 2814.1 | 26.7 | 0.0 | 92.6 | 2 | 2 | Example |
| S104 | 12.9 | 3.5 | 2817.9 | 31.5 | 0.3 | 111.3 | 3 | 3 | Example |

Example 3

Next, surface-treated steel sheets further comprising a Ni-containing layer disposed under the metallic Cr layer were produced and their properties were evaluated. In detail, in Example 3, surface-treated steel sheets each comprising: a steel sheet; a Ni-containing layer disposed on at least one surface of the steel sheet; a metallic Cr layer disposed on the surface of the Ni—containing layer; and a Cr oxide layer disposed on the metallic Cr layer were produced.

(Ni-Containing Layer)

As the Ni-containing layer, any of a Ni layer and a Ni—Fe alloy layer was used as shown in Tables 12 and 13.

The Ni layer was formed by Ni electroplating. Specifically, steel sheets were each subjected to electrolytic degreasing, water washing, pickling by immersion in dilute sulfuric acid, and water washing in sequence, and then subjected to Ni electroplating using a Watts bath to form a Ni layer on both sides of the steel sheet, thus obtaining a Ni coated steel sheet. Here, the electric quantity density was varied to cause the Ni coating weight of the Ni layer to be the value shown in Tables 12 and 13. The Ni coating weight of the Ni layer was measured by the above-described calibration curve method using fluorescent X-rays. As each of the steel sheets, a steel sheet for cans (T4 blank sheet) having the Cr content shown in Tables 12 and 13 and a sheet thickness of 0.17 mm was used. After the Ni layer was formed, the Ni coated steel sheet was washed with water and, while being kept wet, subjected to a cathodic electrolysis treatment process.

In some examples, after the Ni layer was formed by the foregoing procedure, annealing was performed to form the Ni—Fe alloy layer.

The obtained Ni coated steel sheet was then subjected to a cathodic electrolysis treatment process, an immersion process, and a water washing process to obtain a surface-treated steel sheet. The cathodic electrolysis treatment process, the immersion process, and the water washing process were performed under the conditions shown in Tables 12 and 13, and all other conditions were the same as in Example 1.

For each of the obtained surface-treated steel sheets, the Cr coating weight of the metallic Cr layer per one side of the steel sheet and the Cr coating weight of the Cr oxide layer per one side of the steel sheet were measured by the same methods as in Example 1. Moreover, for each of the obtained surface-treated steel sheets, the contact angle of ethylene glycol, the amount of adsorbed elements, and the Fe atomic ratio were measured by the same methods as in Example 1. Furthermore, in this example, the Ni atomic ratio was measured by the following procedure. The measurement results are shown in Tables 14 and 15. The total of the Ni coating weight of the Ni-containing layer and the Cr coating weight of the metallic Cr layer is also shown in Tables 14 and 15.

(Ni Atomic Ratio)

The atomic ratio of Ni to Cr on the surface of the surface-treated steel sheet was measured by XPS. No sputtering was performed in the measurement. From the integrated intensities of the narrow spectra of Ni2p and Cr2p on the surface of the sample, the atomic ratios were quantified by the relative sensibility coefficient method, and (the Ni atomic ratio)/(the Cr atomic ratio) was calculated. For the XPS measurement, a scanning X-ray photoelectron spectrometer PHI X-tool produced by ULVAC-PHI, Inc. was used. The X-ray source was a monochromatic AlKα ray, the voltage was 15 kV, the beam diameter was 100 μmφ, and the extraction angle was 45°.

Furthermore, for each of the obtained surface-treated steel sheets, adhesion to BPA-free paint and BPA-free painting corrosion resistance were evaluated by the same methods as in Example 1. The evaluation results are shown in Tables 14 and 15.

[Table 12]

TABLE 12

| | Production conditions | | | | | | | | |
|---|---|---|---|---|---|---|---|---|---|
| | Steel sheet | Ni-containing layer | | Cathodic electrolysis treatment | | Immersion treatment | | Water washing treatment First time | |
| No. | Cr content [%] | Type | Ni coating weight [mg/m$^2$] | Electrolyte | Electric quantity density [C/dm$^2$] | Electrolyte | Immersion time [sec] | Method | Conductivity [μS/m] |
| N1 | 0.04 | Ni | 204 | A | 100 | A | 1.65 | Immersion | 23 |
| N2 | 0.04 | Ni | 304 | B | 120 | B | 1.85 | Spray | 25 |
| N3 | 0.04 | Ni | 76 | C | 80 | C | 1.80 | Spray | 15 |
| N4 | 0.04 | Ni | 13 | D | 40 | D | 2.56 | Spray | 27 |
| N5 | 0.04 | Ni | 7 | E | 50 | E | 3.50 | Spray | 26 |
| N6 | 0.04 | Ni | 145 | F | 200 | F | 2.78 | Immersion | 12 |
| N7 | 0.04 | Ni | 989 | A | 300 | A | 3.20 | Spray | 7 |
| N8 | 0.04 | Ni | 1689 | B | 420 | B | 3.87 | Immersion | 13 |
| N9 | 0.04 | Ni | 1456 | C | 200 | C | 2.40 | Immersion | 7 |
| N10 | 0.04 | Ni | 57 | D | 90 | D | 3.22 | Immersion | 8 |
| N11 | 0.04 | Ni-Fe | 5 | E | 240 | E | 3.60 | Immersion | 59 |
| N12 | 0.04 | Ni-Fe | 408 | F | 80 | F | 3.50 | Immersion | 209 |
| N13 | 0.04 | Ni-Fe | 1659 | A | 60 | A | 3.90 | Immersion | 24 |
| N14 | 0.04 | Ni-Fe | 1987 | B | 240 | B | 2.40 | Immersion | 16 |
| N15 | 0.04 | Ni-Fe | 459 | C | 120 | C | 1.55 | Immersion | 55 |
| N16 | 0.04 | Ni-Fe | 807 | D | 240 | D | 2.45 | Immersion | 46 |
| N17 | 0.04 | Ni | 772 | E | 40 | E | 3.10 | Immersion | 32 |
| N18 | 0.04 | Ni | 114 | F | 120 | F | 2.14 | Spray | 37 |
| N19 | 0.04 | Ni | 354 | A | 360 | A | 2.76 | Immersion | 54 |
| N20 | 0.04 | Ni | 434 | B | 200 | B | 3.76 | Spray | 67 |
| N21 | 0.04 | Ni | 267 | C | 100 | C | 1.67 | Immersion | 183 |
| N22 | 0.04 | Ni | 1638 | D | 60 | D | 2.11 | Spray | 146 |
| N23 | 0.04 | Ni | 1368 | E | 80 | E | 3.44 | Immersion | 12 |
| N24 | 0.04 | Ni | 734 | F | 20 | F | 2.43 | Immersion | 16 |
| N25 | 0.04 | Ni | 13 | A | 100 | A | 1.78 | Immersion | 22 |
| N26 | 0.04 | Ni | 653 | B | 220 | B | 2.79 | Immersion | 9 |
| N27 | 0.04 | Ni | 436 | C | 100 | C | 3.38 | Immersion | 10 |
| N28 | 0.04 | Ni | 302 | D | 240 | D | 2.50 | Immersion | 12 |
| N29 | 0.04 | Ni | 87 | E | 440 | E | 3.69 | Immersion | 18 |
| N30 | 0.04 | Ni | 20 | F | 320 | F | 2.55 | Spray | 15 |
| N31 | 0.04 | Ni | 597 | A | 200 | A | 1.66 | Immersion | 23 |
| N32 | 0.04 | Ni | 59 | B | 120 | B | 2.30 | Immersion | 20 |
| N33 | 0.04 | Ni | 1325 | C | 100 | C | 3.90 | Immersion | 21 |
| N34 | 0.04 | Ni | 1638 | D | 40 | D | 3.20 | Immersion | 18 |
| N35 | 0.04 | Ni | 782 | E | 40 | E | 2.50 | Immersion | 12 |
| N36 | 0.04 | Ni | 604 | F | 100 | F | 2.10 | Immersion | 15 |
| N37 | 0.04 | Ni | 309 | A | 20 | A | 1.75 | Immersion | 7 |
| N38 | 0.04 | Ni | 1309 | B | 240 | B | 1.80 | Spray | 21 |
| N39 | 0.04 | Ni | 980 | C | 40 | C | 2.00 | Immersion | 19 |

| | Production conditions Water washing treatment | | | | | | | | |
|---|---|---|---|---|---|---|---|---|---|
| | Second time | | Third time | | Fourth time | | Fifth time | | |
| No. | Method | Conductivity [μS/m] | Method | Conductivity [μS/m] | Method | Conductivity [μS/m] | Method | Conductivity [μS/m] | Remarks |
| N1 | — | — | — | — | — | — | — | — | Example |
| N2 | — | — | — | — | — | — | — | — | Example |
| N3 | Immersion | 21 | — | — | — | — | — | — | Example |
| N4 | Spray | 11 | — | — | — | — | — | — | Example |
| N5 | Immersion | 25 | Immersion | 21 | — | — | — | — | Example |
| N6 | Immersion | 12 | Spray | 13 | — | — | — | — | Example |
| N7 | Immersion | 8 | Immersion | 14 | Immersion | 13 | — | — | Example |
| N8 | Immersion | 12 | Spray | 12 | Spray | 10 | — | — | Example |
| N9 | Immersion | 19 | Immersion | 11 | Immersion | 21 | Immersion | 14 | Example |
| N10 | Spray | 21 | Spray | 19 | Immersion | 29 | Spray | 28 | Example |
| N11 | Immersion | 25 | Spray | 21 | — | — | — | — | Example |
| N12 | Spray | 16 | Spray | 27 | — | — | — | — | Example |
| N13 | Immersion | 209 | Spray | 30 | — | — | — | — | Example |
| N14 | Spray | 68 | Spray | 23 | — | — | — | — | Example |
| N15 | Immersion | 108 | Spray | 26 | — | — | — | — | Example |
| N16 | Spray | 34 | Spray | 12 | — | — | — | — | Example |
| N17 | — | — | — | — | — | — | — | — | Example |
| N18 | — | — | — | — | — | — | — | — | Example |
| N19 | — | — | — | — | — | — | — | — | Example |

TABLE 12-continued

| | | | | | | | | | |
|---|---|---|---|---|---|---|---|---|---|
| N20 | — | — | — | — | — | — | — | — | Example |
| N21 | — | — | — | — | — | — | — | — | Comparative Example |
| N22 | — | — | — | — | — | — | — | — | Comparative Example |
| N23 | Immersion | 45 | — | — | — | — | — | — | Example |
| N24 | Spray | 35 | — | — | — | — | — | — | Example |
| N25 | Immersion | 89 | — | — | — | — | — | — | Example |
| N26 | Spray | 58 | — | — | — | — | — | — | Example |
| N27 | Immersion | 132 | — | — | — | — | — | — | Comparative Example |
| N28 | Spray | 150 | — | — | — | — | — | — | Comparative Example |
| N29 | Immersion | 21 | Immersion | 39 | — | — | — | — | Example |
| N30 | Immersion | 12 | Spray | 49 | — | — | — | — | Example |
| N31 | Spray | 20 | Immersion | 65 | — | — | — | — | Example |
| N32 | Immersion | 19 | Spray | 53 | — | — | — | — | Example |
| N33 | Spray | 8 | Immersion | 132 | — | — | — | — | Comparative Example |
| N34 | Immersion | 6 | Spray | 198 | — | — | — | — | Comparative Example |
| N35 | Immersion | 21 | Spray | 21 | Immersion | 43 | — | — | Example |
| N36 | Spray | 18 | Immersion | 11 | Spray | 37 | — | — | Example |
| N37 | Immersion | 17 | Spray | 22 | Immersion | 97 | — | — | Example |
| N38 | Immersion | 21 | Spray | 18 | Spray | 68 | — | — | Example |
| N39 | Immersion | 28 | Spray | 17 | Immersion | 209 | — | — | Comparative Example |

[Table 13]

TABLE 13

| | Production conditions | | | | | | | | |
|---|---|---|---|---|---|---|---|---|---|
| | | | | | | Immersion treatment | | Water washing treatment | |
| | Steel sheet | Ni-containing layer | | Cathodic electrolysis treatment | | | Immersion | First time | |
| No. | Cr content [%] | Type | Ni coating weight [mg/m$^2$] | Electrolyte | Electric quantity density [C/dm$^2$] | Electrolyte | time [sec] | Method | Conductivity [μS/m] |
| N40 | 0.04 | Ni | 246 | D | 60 | D | 3.00 | Spray | 27 |
| N41 | 0.04 | Ni | 704 | E | 260 | E | 2.60 | Immersion | 19 |
| N42 | 0.04 | Ni | 308 | F | 420 | F | 3.73 | Immersion | 20 |
| N43 | 0.04 | Ni | 509 | A | 180 | A | 2.98 | Immersion | 23 |
| N44 | 0.04 | Ni | 25 | B | 130 | B | 2.63 | Immersion | 19 |
| N45 | 0.04 | Ni | 548 | C | 10 | C | 1.78 | Immersion | 25 |
| N46 | 0.04 | Ni | 321 | D | 160 | D | 2.65 | Immersion | 18 |
| N47 | 0.04 | Ni | 1854 | E | 80 | E | 1.80 | No water washing | — |
| N48 | 0.04 | Ni | 890 | G | 240 | G | 2.35 | Immersion | 21 |
| N49 | 0.04 | Ni | 473 | G | 120 | G | 3.45 | Immersion | 12 |
| N50 | 0.04 | Ni | 4 | A | 60 | A | 3.00 | Immersion | 15 |
| N51 | 0.04 | Ni | 1 | B | 100 | B | 2.60 | Immersion | 18 |
| N52 | 0.04 | Ni | 779 | A | 4 | A | 2.44 | Immersion | 6 |
| N53 | 0.04 | Ni | 483 | B | 2 | B | 1.59 | Spray | 12 |
| N54 | 0.04 | Ni | 648 | C | 460 | C | 2.60 | Spray | 15 |
| N55 | 0.04 | Ni | 227 | D | 500 | D | 3.40 | Spray | 21 |
| N56 | 0.04 | Ni | 7 | A | 20 | A | 2.88 | Spray | 22 |
| N57 | 0.04 | Ni | 12 | B | 60 | B | 3.42 | Immersion | 18 |
| N58 | 0.04 | Ni | 609 | D | 200 | D | 1.42 | Spray | 23 |
| N59 | 0.04 | Ni | 342 | E | 80 | E | 1.15 | Spray | 11 |
| N60 | 0.04 | Ni | 254 | F | 140 | F | 0.80 | Spray | 9 |
| N61 | 0.04 | Ni | 609 | A | 100 | A | 4.20 | Spray | 23 |
| N62 | 0.04 | Ni | 342 | B | 120 | B | 4.80 | Spray | 11 |
| N63 | 0.04 | Ni | 254 | C | 400 | C | 5.60 | Spray | 9 |
| N64 | 0.04 | Ni | 768 | A | 300 | B | 2.50 | Spray | 13 |
| N65 | 0.04 | Ni | 479 | B | 100 | D | 2.30 | Spray | 15 |
| N66 | 0.04 | Ni | 475 | C | 120 | F | 3.70 | Spray | 9 |
| N67 | 0.04 | Ni | 274 | D | 80 | E | 3.88 | Spray | 13 |
| N68 | 0.04 | Ni | 476 | E | 90 | A | 2.34 | Spray | 18 |
| N69 | 0.04 | Ni | 345 | F | 150 | C | 2.10 | Spray | 29 |
| N70 | 0.04 | Ni | 287 | B | 160 | G | 1.60 | Spray | 28 |
| N71 | 0.04 | Ni | 68 | C | 180 | G | 1.50 | Spray | 11 |
| N72 | 0.04 | Ni | 428 | E | 240 | G | 2.80 | Spray | 14 |
| N73 | 0.04 | Ni | 451 | G | 60 | A | 1.65 | Spray | 9 |

TABLE 13-continued

| | | | | | | | | | |
|---|---|---|---|---|---|---|---|---|---|
| N74 | 0.04 | Ni | 886 | G | 150 | D | 2.50 | Spray | 15 |
| N75 | 0.04 | Ni | 576 | G | 280 | F | 3.40 | Spray | 12 |
| N76 | 0.09 | Ni | 405 | E | 120 | E | 3.50 | Spray | 22 |
| N77 | 0.12 | Ni | 886 | F | 100 | F | 2.00 | Spray | 19 |

| | Production conditions Water washing treatment | | | | | | | | |
|---|---|---|---|---|---|---|---|---|---|
| | Second time | | Third time | | Fourth time | | Fifth time | | |
| No. | Method | Conductivity [μS/m] | Method | Conductivity [μS/m] | Method | Conductivity [μS/m] | Method | Conductivity [μS/m] | Remarks |
| N40 | Immersion | 23 | Spray | 13 | Spray | 154 | — | — | Comparative Example |
| N41 | Spray | 16 | Spray | 12 | Immersion | 13 | Immersion | 33 | Example |
| N42 | Spray | 9 | Immersion | 16 | Immersion | 21 | Spray | 48 | Example |
| N43 | Immersion | 13 | Spray | 9 | Immersion | 18 | Immersion | 65 | Example |
| N44 | Immersion | 11 | Spray | 22 | Immersion | 11 | Spray | 83 | Example |
| N45 | Immersion | 12 | Spray | 25 | Immersion | 9 | Immersion | 208 | Comparative Example |
| N46 | Immersion | 21 | Spray | 15 | Immersion | 16 | Spray | 172 | Comparative Example |
| N47 | — | — | — | — | — | — | — | — | Comparative Example |
| N48 | Immersion | 12 | Spray | 19 | — | — | — | — | Comparative Example |
| N49 | Spray | 14 | Immersion | 10 | — | — | — | — | Comparative Example |
| N50 | Spray | 21 | — | — | — | — | — | — | Example |
| N51 | Spray | 29 | — | — | — | — | — | — | Example |
| N52 | Spray | 25 | — | — | — | — | — | — | Example |
| N53 | Spray | 24 | — | — | — | — | — | — | Example |
| N54 | Spray | 15 | — | — | — | — | — | — | Example |
| N55 | Spray | 16 | — | — | — | — | — | — | Example |
| N56 | Spray | 8 | — | — | — | — | — | — | Example |
| N57 | Spray | 26 | — | — | — | — | — | — | Example |
| N58 | Spray | 10 | — | — | — | — | — | — | Example |
| N59 | Spray | 9 | — | — | — | — | — | — | Example |
| N60 | Spray | 15 | — | — | — | — | — | — | Comparative Example |
| N61 | Spray | 10 | — | — | — | — | — | — | Example |
| N62 | Spray | 9 | — | — | — | — | — | — | Example |
| N63 | Spray | 15 | — | — | — | — | — | — | Comparative Example |
| N64 | Spray | 17 | — | — | — | — | — | — | Example |
| N65 | Spray | 13 | — | — | — | — | — | — | Example |
| N66 | Spray | 11 | — | — | — | — | — | — | Example |
| N67 | Spray | 10 | — | — | — | — | — | — | Example |
| N68 | Spray | 8 | — | — | — | — | — | — | Example |
| N69 | Spray | 6 | — | — | — | — | — | — | Example |
| N70 | Spray | 21 | — | — | — | — | — | — | Comparative Example |
| N71 | Spray | 12 | — | — | — | — | — | — | Comparative Example |
| N72 | Spray | 23 | — | — | — | — | — | — | Comparative Example |
| N73 | Spray | 25 | — | — | — | — | — | — | Comparative Example |
| N74 | Spray | 21 | — | — | — | — | — | — | Comparative Example |
| N75 | Spray | 9 | — | — | — | — | — | — | Comparative Example |
| N76 | Spray | 19 | — | — | — | — | — | — | Example |
| N77 | Spray | 13 | — | — | — | — | — | — | Example |

[Table 14]

TABLE 14

| | Measurement results | | | | | | Evaluation | | |
|---|---|---|---|---|---|---|---|---|---|
| No. | Metallic Cr layer Cr coating weight [$mg/m^2$] | Cr oxide layer Cr coating weight [$mg/m^2$] | Total of Ni coating weight and Cr coating weight of metallic Cr layer [$mg/m^2$] | Contact angle of ethylene glycol [°] | Atomic ratio of adsorbed elements [%] | Ni atomic ratio [%] | Adhesion to BPA-free paint | BPA-free painting corrosion resistance | Remarks |
| N1 | 103.5 | 2.3 | 307.5 | 34.2 | 0.0 | 21.3 | 1 | 1 | Example |
| N2 | 122.4 | 3.5 | 426.4 | 23.4 | 0.0 | 13.4 | 1 | 1 | Example |
| N3 | 80.9 | 6.5 | 156.9 | 16.7 | 0.0 | 34.5 | 1 | 1 | Example |
| N4 | 40.3 | 2.3 | 53.3 | 23.4 | 0.0 | 22.3 | 1 | 1 | Example |
| N5 | 56.7 | 1.2. | 63.7 | 21.7 | 0.3 | 27.0 | 1 | 1 | Example |
| N6 | 215.6 | 2.8 | 360.6 | 43.5 | 0.6 | 11.5 | 1 | 1 | Example |
| N7 | 304.5 | 2.5 | 1293.5 | 20.6 | 0.0 | 7.8 | 1 | 1 | Example |
| N8 | 445.6 | 3.9 | 2134.6 | 11.5 | 0.3 | 2.3 | 1 | 1 | Example |
| N9 | 202.3 | 2.1 | 1658.3 | 8.9 | 0.9 | 12.0 | 1 | 1 | Example |
| N10 | 89.0 | 6.7 | 146.0 | 23.4 | 0.0 | 0.0 | 1 | 1 | Example |
| N11 | 228.3 | 8.8 | 233.3 | 22.3 | 0.0 | 14.6 | 1 | 1 | Example |
| N12 | 78.9 | 14.5 | 486.9 | 12.6 | 0.0 | 13.2 | 1 | 1 | Example |
| N13 | 43.2 | 2.4 | 1702.2 | 11.3 | 0.2 | 0.0 | 1 | 1 | Example |
| N14 | 208.7 | 11.2 | 2195.7 | 16.4 | 0.0 | 12.4 | 1 | 1 | Example |
| N15 | 112.3 | 6.7 | 571.3 | 12.3 | 0.1 | 0.0 | 1 | 1 | Example |
| N16 | 205.6 | 7.8 | 1012.6 | 14.3 | 0.0 | 22.5 | 1 | 1 | Example |
| N17 | 56.7 | 5.6 | 828.7 | 34.5 | 1.3 | 67.4 | 2 | 2 | Example |
| N18 | 123.4 | 3.4 | 237.4 | 28.7 | 2.4 | 45.4 | 2 | 2 | Example |
| N19 | 349.0 | 4.3 | 703.0 | 19.8 | 3.6 | 23.3 | 3 | 3 | Example |
| N20 | 212.3 | 2.7 | 646.3 | 35.7 | 4.6 | 12.8 | 3 | 3 | Example |
| N21 | 89.7 | 14.3 | 356.7 | 33.2 | 5.6 | 12.4 | 4 | 4 | Comparative Example |
| N22 | 56.0 | 10.9 | 1694.0 | 11.2 | 7.8 | 14.7 | 4 | 4 | Comparative Example |
| N23 | 66.5 | 6.7 | 1434.5 | 14.5 | 2.1 | 13.2 | 2 | 2 | Example |
| N24 | 23.5 | 4.5 | 757.5 | 29.0 | 2.5 | 15.8 | 2 | 2 | Example |
| N25 | 98.7 | 3.2 | 111.7 | 14.3 | 3.4 | 16.3 | 3 | 3 | Example |
| N26 | 210.3 | 4.5 | 863.3 | 25.4 | 3.1 | 64.3 | 3 | 3 | Example |
| N27 | 100.3 | 5.5 | 536.3 | 27.4 | 6.5 | 43.7 | 4 | 4 | Comparative Example |
| N28 | 204.5 | 5.9 | 506.5 | 32.8 | 8.9 | 26.4 | 4 | 4 | Comparative Example |
| N29 | 432.7 | 6.9 | 519.7 | 18.3 | 1.2 | 68.7 | 2 | 2 | Example |
| N30 | 356.7 | 13.9 | 376.7 | 15.1 | 2.8 | 3.5 | 2 | 2 | Example |
| N31 | 210.8 | 9.4 | 807.8 | 19.8 | 4.6 | 24.5 | 3 | 3 | Example |
| N32 | 143.2 | 7.8 | 202.2 | 12.2 | 3.2 | 0.0 | 3 | 3 | Example |
| N33 | 122.6 | 4.5 | 1447.6 | 32.5 | 5.2 | 22.4 | 4 | 4 | Comparative Example |
| N34 | 46.7 | 1.1 | 1684.7 | 25.8 | 5.8 | 10.7 | 4 | 4 | Comparative Example |
| N35 | 54.3 | 0.8 | 836.3 | 17.6 | 2.2 | 0.7 | 2 | 2 | Example |
| N36 | 98.0 | 1.4 | 702.0 | 29.0 | 2.5 | 0.0 | 2 | 2 | Example |
| N37 | 12.6 | 0.3 | 321.6 | 43.1 | 3.6 | 2.4 | 3 | 3 | Example |
| N38 | 234.5 | 2.3 | 1543.5 | 21.5 | 3.9 | 14.6 | 3 | 3 | Example |
| N39 | 41.2 | 2.8 | 1021.2 | 32.7 | 5.6 | 34.2 | 4 | 4 | Comparative Example |

[Table 15]

TABLE 15

| | Measurement results | | | | | | Evaluation | | |
|---|---|---|---|---|---|---|---|---|---|
| No. | Metallic Cr layer Cr coating weight [$mg/m^2$] | Cr oxide layer Cr coating weight [$mg/m^2$] | Total of Ni coating weight and Cr coating weight of metallic Cr layer [$mg/m^2$] | Contact angle of ethylene glycol [°] | Atomic ratio of adsorbed elements [%] | Ni atomic ratio [%] | Adhesion to BPA-free paint | BPA-free painting corrosion resistance | Remarks |
| N40 | 57.8 | 2.6 | 303.8 | 36.8 | 6 | 16.7 | 4 | 4 | Comparative Example |
| N41 | 209.0 | 2.8 | 913.0 | 18.9 | 1.3 | 24.3 | 2 | 2 | Example |
| N42 | 422.1 | 1.4 | 730.1 | 13.2 | 1.8 | 17.8 | 2 | 2 | Example |
| N43 | 165.5 | 4.8 | 674.5 | 16.5 | 3.4 | 24.6 | 3 | 3 | Example |

TABLE 15-continued

| | Measurement results | | | | | | Evaluation | | |
|---|---|---|---|---|---|---|---|---|---|
| No. | Metallic Cr layer Cr coating weight [mg/m$^2$] | Cr oxide layer Cr coating weight [mg/m$^2$] | Total of Ni coating weight and Cr coating weight of metallic Cr layer [mg/m$^2$] | Contact angle of ethylene glycol [°] | Atomic ratio of adsorbed elements [%] | Ni atomic ratio [%] | Adhesion to BPA-free paint | BPA-free painting corrosion resistance | Remarks |
| N44 | 132.5 | 5.8 | 157.5 | 10.9 | 4.2 | 13.5 | 3 | 3 | Example |
| N45 | 12.5 | 9.0 | 560.5 | 12.1 | 5.8 | 11.2 | 4 | 4 | Comparative Example |
| N46 | 154.6 | 5.7 | 475.6 | 11.7 | 7.6 | 35.6 | 4 | 4 | Comparative Example |
| N47 | 78.9 | 4.7 | 1932.9 | 67.9 | 9.0 | 23.5 | 4 | 4 | Comparative Example |
| N48 | 234.7 | 3.9 | 1124.7 | 73.4 | 0.0 | 1.8 | 4 | 4 | Comparative Example |
| N49 | 132.5 | 5.2 | 605.5 | 68.9 | 0.2 | 0.0 | 4 | 4 | Comparative Example |
| N50 | 56.7 | 7.8 | 60.7 | 33.5 | 0.0 | 24.5 | 1 | 2 | Example |
| N51 | 109.7 | 9.6 | 110.7 | 32.9 | 0.0 | 0.0 | 1 | 3 | Example |
| N52 | 4.8 | 4.2 | 783.8 | 21.4 | 0.0 | 11.3 | 1 | 2 | Example |
| N53 | 1.8 | 3.3 | 484.8 | 23.6 | 0.4 | 17.6 | 1 | 3 | Example |
| N54 | 467.0 | 8.7 | 1115.0 | 32.6 | 0.0 | 14.6 | 2 | 2 | Example |
| N55 | 512.3 | 3.6 | 739.3 | 25.9 | 0.3 | 12.3 | 3 | 3 | Example |
| N56 | 36.5 | 4.2 | 43.5 | 26.8 | 0.0 | 43.5 | 1 | 2 | Example |
| N57 | 22.1 | 3.6 | 34.1 | 33.5 | 0.1 | 32.2 | 1 | 3 | Example |
| N58 | 223.4 | 13.7 | 832.4 | 46.4 | 0.3 | 34.7 | 2 | 2 | Example |
| N59 | 89.0 | 2.1 | 431.0 | 48.9 | 0.5 | 28.6 | 3 | 3 | Example |
| N60 | 136.7 | 1.0 | 390.7 | 53.6 | 0.3 | 35.7 | 4 | 4 | Comparative Example |
| N61 | 117.8 | 0.8 | 726.8 | 45.8 | 0.0 | 23.5 | 2 | 2 | Example |
| N62 | 123.4 | 3.5 | 465.4 | 49.7 | 0.6 | 27.6 | 3 | 3 | Example |
| N63 | 354.9 | 7.3 | 608.9 | 51.7 | 0.0 | 35.6 | 4 | 4 | Comparative Example |
| N64 | 289.7 | 2.4 | 1057.7 | 21.7 | 0.0 | 23.7 | 1 | 1 | Example |
| N65 | 143.9 | 7.8 | 622.9 | 22.3 | 0.0 | 28.7 | 1 | 1 | Example |
| N66 | 131.6 | 5.7 | 606.6 | 21.8 | 0.0 | 24.3 | 1 | 1 | Example |
| N67 | 78.9 | 4.8 | 352.9 | 32.9 | 0.8 | 18.6 | 1 | 1 | Example |
| N68 | 88.4 | 3.6 | 564.4 | 23.4 | 0.3 | 0.0 | 1 | 1 | Example |
| N69 | 144.6 | 2.4 | 489.6 | 21.9 | 0.0 | 65.5 | 1 | 1 | Example |
| N70 | 154.8 | 1.7 | 441.8 | 64.3 | 0.0 | 24.4 | 4 | 4 | Comparative Example |
| N71 | 176.2 | 2.4 | 244.2 | 77.8 | 0.0 | 2.0 | 4 | 4 | Comparative Example |
| N72 | 234.3 | 2.8 | 662.3 | 53.4 | 0.0 | 22.8 | 4 | 4 | Comparative Example |
| N73 | 55.8 | 4.7 | 506.8 | 58.9 | 0.4 | 25.2 | 4 | 4 | Comparative Example |
| N74 | 129.8 | 9.8 | 1015.8 | 78.9 | 0.3 | 15.7 | 4 | 4 | Comparative Example |
| N75 | 265.8 | 6.7 | 841.8 | 89.0 | 0.0 | 13.5 | 4 | 4 | Comparative Example |
| N76 | 121.3 | 2.4 | 526.3 | 21.4 | 0.2 | 90.3 | 2 | 2 | Example |
| N77 | 112.2 | 12.8 | 998.2 | 34.5 | 0.0 | 121.3 | 3 | 3 | Example |

As is clear from the results of Examples 1 to 3, each surface-treated steel sheet satisfying the conditions according to the present disclosure was able to be produced without using hexavalent chromium and had excellent adhesion to BPA-free paint and BPA-free painting corrosion resistance.

The invention claimed is:

1. A surface-treated steel sheet comprising:

a steel sheet;

a metallic Cr layer disposed on at least one surface of the steel sheet; and a Cr oxide layer disposed on the metallic Cr layer, the surface-treated steel sheet having:

a contact angle of ethylene glycol of 50° or less, wherein the contact angle of ethylene glycol is measured as follows: a surface temperature of the surface-treated steel sheet during measurement is 20° C. ±1° C., and a temperature of the ethylene glycol is 20° C. ±1° C., and 2 μl of ethylene glycol is dropped onto the surface of the surface-treated steel sheet and, after 1 second, the contact angle is measured by the θ/2 method, and arithmetic mean value of the contact angles for 5 droplets is taken to be the contact angle of ethylene glycol, and a total atomic ratio of K, Na, Mg, and Ca adsorbed on a surface of the Cr oxide layer to Cr of 5.0% or less, wherein the total atomic ratio of K, Na, Mg, and Ca adsorbed on the surface of the Cr oxide layer to Cr is measured by XPS, and wherein the steel sheet has a chemical composition consisting of, in mass %, C: 0.0001% to 0.13%, Si: 0% to 0.020%, Mn: 0.01% to 0.60%, P: 0% to 0.020%, S: 0% to 0.030%, Al: 0% to 0.20%, N: 0% to 0.040%, and optionally at least one selected from the group consisting of Cu: more than 0% and 0.20% or less,
Ni: more than 0% and 0.15% or less,
Cr: more than 0% and 0.10% or less,
Mo: more than 0% and 0.05% or less,
Ti: more than 0% and 0.020% or less,
Nb: more than 0% and 0.020% or less,
B: more than 0% and 0.020% or less,
Ca: more than 0% and 0.020% or less,
Sn: more than 0% and 0.020% or less, and
Sb: more than 0% and 0.020% or less, with the balance consisting of Fe and inevitable impurities.

2. The surface-treated steel sheet according to claim 1, wherein the metallic Cr layer is disposed directly on the surface of the steel sheet, and a Cr coating weight of the metallic Cr layer is 40.0 mg/m$^2$ or more and 500.0 mg/m$^2$ or less per one side of the steel sheet.

3. The surface-treated steel sheet according to claim 1, wherein an atomic ratio of Fe to Cr on the surface of the Cr oxide layer of the surface-treated steel sheet is 15% or less, wherein the atomic ratio of Fe to Cr on the surface of the Cr oxide layer of the surface-treated steel sheet is measured by XPS.

4. The surface-treated steel sheet according to claim 1, further comprising a Sn layer disposed on at least one side of the steel sheet and under the metallic Cr layer.

5. The surface-treated steel sheet according to claim 4, wherein a Sn coating weight of the Sn layer is 2.0 mg/m$^2$ or more and 20.0 g/m$^2$ or less per one side of the steel sheet, a Cr coating weight of the metallic Cr layer is 2.0 mg/m$^2$ or more and 500.0 mg/m$^2$ or less per one side of the steel sheet, and a total of the Sn coating weight and the Cr coating weight is 40.0 mg/m$^2$ or more per one side of the steel sheet.

6. The surface-treated steel sheet according to claim 4, wherein an atomic ratio of Sn to Cr on the surface of the Cr oxide layer of the surface-treated steel sheet is 100% or less, wherein the atomic ratio of Sn to Cr on the surface of the Cr oxide layer of the surface-treated steel sheet is measured by XPS.

7. The surface-treated steel sheet according to claim 4, further comprising a Ni-containing layer disposed on at least one side of the steel sheet and under the Sn layer.

8. The surface-treated steel sheet according to claim 7, wherein a Ni coating weight of the Ni-containing layer is 2.0 mg/m$^2$ or more and 2000 mg/m$^2$ or less per one side of the steel sheet.

9. The surface-treated steel sheet according to claim 1, further comprising a Ni-containing layer disposed on at least one side of the steel sheet and under the metallic Cr layer.

10. The surface-treated steel sheet according to claim 9, wherein a Ni coating weight of the Ni-containing layer is 2.0 mg/m$^2$ or more and 2000.0 mg/m$^2$ or less per one side of the steel sheet, a Cr coating weight of the metallic Cr layer is 2.0 mg/m$^2$ or more and 500.0 mg/m$^2$ or less per one side of the steel sheet, and a total of the Ni coating weight and the Cr coating weight is 40.0 mg/m$^2$ or more per one side of the steel sheet.

11. The surface-treated steel sheet according to claim 9, wherein an atomic ratio of Ni to Cr on the surface of the Cr oxide layer of the surface-treated steel sheet is 100% or less, wherein the atomic ratio of Ni to Cr on the surface of the Cr oxide layer of the surface-treated steel sheet is measured by XPS.

12. The surface-treated steel sheet according to claim 1, wherein a Cr coating weight of the Cr oxide layer is 0.1 mg/m$^2$ or more and 15.0 mg/m$^2$ or less per one side of the steel sheet.

13. A method of producing a surface-treated steel sheet according to claim 1, the method comprising:

an electrolyte preparation process of preparing an electrolyte containing trivalent chromium ions;

a cathodic electrolysis treatment process of subjecting the steel sheet to cathodic electrolysis treatment in the electrolyte;

an immersing process of immersing the steel sheet after the cathodic electrolysis treatment in the electrolyte for 1.0 second or more and 5.0 seconds or less electrolessly; and a water washing process of at least one water wash of the steel sheet after the cathodic electrolysis treatment, wherein, in the electrolyte preparation process, the electrolyte is prepared by:

mixing a trivalent chromium ion source, a carboxylic acid compound, and water; and adjusting the pH to 4.0 to 7.0 and adjusting the temperature to 40° C. to 70° C., and in the water washing process, water having an electrical conductivity of 100 μS/m or less is used in at least the last water wash.

14. The method of producing a surface-treated steel sheet according to claim 13, wherein the surface-treated steel sheet further includes a Sn layer disposed under the metallic Cr layer, and wherein, in the cathodic electrolysis treatment process, the steel sheet subjected to the cathodic electrolysis treatment is a steel sheet having the Sn layer on at least one side thereof.

15. The method of producing a surface-treated steel sheet according to claim 13, wherein the surface-treated steel sheet further includes a Sn layer disposed under the metallic Cr layer, and wherein the surface-treated steel sheet further includes a Ni-containing layer disposed under the Sn layer, and wherein, in the cathodic electrolysis treatment process, the steel sheet subjected to the cathodic electrolysis treatment is a steel sheet having the Ni-containing layer on at least one side thereof and the Sn layer disposed on the Ni-containing layer.

16. The method of producing a surface-treated steel sheet according to claim 13, wherein the surface-treated steel sheet further includes a Ni-containing layer disposed under the metallic Cr layer, and wherein, in the cathodic electrolysis treatment process, the steel sheet subjected to the cathodic electrolysis treatment is a steel sheet having the Ni-containing layer on at least one side thereof.

* * * * *